United States Patent
Ishii et al.

(10) Patent No.: US 11,760,301 B2
(45) Date of Patent: Sep. 19, 2023

(54) STEERING WHEEL AIRBAG DEVICE

(71) Applicant: TOYODA GOSEI CO., LTD., Kiyosu (JP)

(72) Inventors: Tsutomu Ishii, Kiyosu (JP); Koji Kawamura, Kiyosu (JP); Yuya Suzuki, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/894,234

(22) Filed: Aug. 24, 2022

(65) Prior Publication Data

US 2023/0061257 A1 Mar. 2, 2023

(30) Foreign Application Priority Data

Aug. 25, 2021 (JP) ................................. 2021-137519

(51) Int. Cl.
 *B60R 21/203* (2006.01)
 *B60R 21/2346* (2011.01)

(52) U.S. Cl.
 CPC ...... *B60R 21/2346* (2013.01); *B60R 21/2035* (2013.01)

(58) Field of Classification Search
 CPC ............................................. B60R 21/2346
 See application file for complete search history.

(56) References Cited

U.S. PATENT DOCUMENTS

| | | | |
|---|---|---|---|
| 5,573,270 A * | 11/1996 | Sogi | B60R 21/2346 280/743.1 |
| 7,976,063 B2 * | 7/2011 | Abe | B60R 21/2338 280/743.1 |
| 8,925,962 B2 * | 1/2015 | Yamada | B60R 21/2334 280/743.1 |
| 11,180,103 B2 * | 11/2021 | Hess | B60R 21/2346 |
| 11,198,411 B2 * | 12/2021 | Yaney | B60R 21/2334 |
| 2002/0005639 A1 | 1/2002 | Varcus | |

(Continued)

FOREIGN PATENT DOCUMENTS

| | | | | |
|---|---|---|---|---|
| CN | 114919526 A * | 8/2022 | ........... | B60R 21/203 |
| DE | 19858690 A1 * | 6/2000 | ........... | B60R 21/233 |

(Continued)

*Primary Examiner* — Nicole T Verley
(74) *Attorney, Agent, or Firm* — POSZ LAW GROUP, PLC

(57) ABSTRACT

A steering wheel airbag device includes an airbag and an inflator. The airbag includes: a bag body; and a rectifying member rectifies expansion gas discharged from the inflator. The rectifying member is provided with three gas outlet ports so that the expansion gas can flow out substantially along a ring surface of the ring portion and to left, right, and rear three sides. The rectifying member is configured by partially joining outer peripheral edges of a vehicle body side panel and a driver side panel. The vehicle body side panel is configured to have three joining portions which are joined to corresponding outer peripheral edges of the driver side panel and three non-joining regions between the joining portions arranged on an outer peripheral edge side of the flat surface portion. The gas outlet port is configured by a portion of the non-joining region between the joining portions.

4 Claims, 21 Drawing Sheets

(56) References Cited

U.S. PATENT DOCUMENTS

| | | | | |
|---|---|---|---|---|
| 2009/0051144 | A1* | 2/2009 | Kai | B60R 21/2346 |
| | | | | 280/728.1 |
| 2015/0137489 | A1* | 5/2015 | Vinton | B60R 21/2346 |
| | | | | 280/742 |
| 2018/0001865 | A1* | 1/2018 | Ooka | B60R 21/26 |
| 2020/0331420 | A1 | 10/2020 | Morita et al. | |
| 2021/0316688 | A1* | 10/2021 | Koizumi | B60R 21/2346 |
| 2022/0250574 | A1* | 8/2022 | Borusu | B60R 21/203 |

FOREIGN PATENT DOCUMENTS

| | | | | | |
|---|---|---|---|---|---|
| DE | 102019121071 | A1 | * | 2/2021 | |
| EP | 1013514 | A2 | * | 6/2000 | B60R 21/233 |
| EP | 1167128 | A2 | * | 1/2002 | B60R 21/233 |
| JP | 2000177521 | A | * | 6/2000 | B60R 21/233 |
| JP | 2002-29354 | A | | 1/2002 | |
| KR | 20220009831 | A | * | 1/2022 | |
| WO | WO-0166385 | A1 | * | 9/2001 | B60R 21/233 |
| WO | WO-2011074423 | A1 | * | 6/2011 | B60R 21/2346 |
| WO | WO-2012099154 | A1 | * | 7/2012 | B60R 21/233 |
| WO | 2019/069796 | A | | 4/2019 | |
| WO | WO-2021101166 | A1 | * | 5/2021 | B60R 21/203 |

* cited by examiner

STEERING WHEEL AIRBAG DEVICE

CROSS-REFERENCE TO RELATED APPLICATION(S)

This application is based upon and claims the benefit of priority from prior Japanese patent application No. 2021-137519 filed on Aug. 25, 2021, the entire contents of which are incorporated herein by reference.

BACKGROUND

1. Field of the Invention

The present invention relates to a steering wheel airbag device having a configuration in which an airbag which allows expansion gas to flow in and expands so as to cover a steering wheel and an inflator which supplies expansion gas to the airbag are provided, and the folded airbag and the inflator are accommodated in an accommodation portion formed in a boss portion located in a vicinity of a center of a ring portion to be gripped during steering in the steering wheel.

2. Description of the Related Art

In recent years, as a steering wheel airbag device, there has been an airbag device having a configuration in which, as an airbag, a bag body expandable to cover an upper surface side of a steering wheel and a rectifying member which is placed inside the bag body, rectifies expansion gas discharged from an inflator, and causes the expansion gas to flow out into the bag body are provided (see, for example, WO 2019/69796 A1). In the steering wheel airbag device of the related art, the rectifying member placed in the bag body is configured to allow expansion gas discharged from the inflator to flow out substantially along a ring surface of a ring portion of the steering wheel, and to the left, right, and rear three sides of the steering wheel in a straight-ahead steering state.

However, in the steering wheel airbag device of the related art, the rectifying member has a configuration in which by making a vehicle body side member arranged on a steering wheel side into a three-dimensional shape by joining predetermined edges to each other, and connecting outer peripheral edges of the three-dimensional vehicle body side member and a driver side member arranged on a driver side to each other at a predetermined position, expansion gas is discharged from between the driver side member and the vehicle body side member so as to be substantially along the ring surface. Thus, the configuration of the steering wheel airbag device of the related art was not simple. In addition, since the vehicle body side member having a three-dimensional shape is formed by joining the predetermined edges to each other, the rectifying member tends to be bulky, and further since this rectifying member is folded together with the bag body, there is room for improvement also in terms of the airbag itself which is folded compactly and accommodated in an accommodation portion.

SUMMARY

The present invention is to solve the problems described above, and an object of the present invention is to provide a steering wheel airbag device in which a rectifying member placed inside can have a simple configuration, and an airbag can be compactly accommodated in an accommodation portion.

According to an aspect of the present invention, there is provided a steering wheel airbag device including: an airbag which allows expansion gas to flow in and expands to cover a steering wheel; and an inflator which supplies expansion gas to the airbag, where: the airbag which is folded and the inflator are accommodated in an accommodation portion formed in a boss portion located in a vicinity of a center of a ring portion to be gripped during steering in the steering wheel; the airbag includes: a bag body which has an inflow opening through which the expansion gas discharged from the inflator can flow into the inside and which can be expanded so as to cover an upper surface side of the steering wheel; and a rectifying member, which is arranged in the bag body so as to cover the inflow opening, rectifies the expansion gas discharged from the inflator, and causes the rectified expansion gas to flow out into the bag body, the rectifying member is provided with three gas outlet ports so that the expansion gas can flow out substantially along a ring surface of the ring portion and to left, right, and rear three sides in a straight-ahead steering state of the steering wheel; the rectifying member is configured by partially joining outer peripheral edges of a vehicle body side panel arranged on the steering wheel side and a driver side panel arranged on a driver side, both panels being formed from sheet bodies having flexibility; the vehicle body side panel is configured to have an opening portion corresponding to the inflow opening formed on the bag body and a flat surface portion connected to the opening portion and to have three joining portions which are joined to corresponding outer peripheral edges of the driver side panel and three non-joining regions between the joining portions arranged on an outer peripheral edge side of the flat surface portion; and the gas outlet port is configured by a portion of the non-joining region between the joining portions which join the outer peripheral edges of the vehicle body side panel and the driver side panel.

In the steering wheel airbag device of the present invention, the rectifying member arranged in the bag body is configured by partially joining the outer peripheral edges of the vehicle body side panel and the driver side panel, which are made of a flexible sheet body, to each other. Specifically, the vehicle body side panel forming the rectifying member has a configuration in which three joining portions joined to the corresponding outer peripheral edges of the driver side panel and three non-joining regions between the joining portions are arranged on the outer peripheral edge side of the flat surface portion formed so as to be continuous from the opening portion corresponding to the inflow opening of the bag body. That is, in the steering wheel airbag device of the present invention, the rectifying member is formed by partially joining only the outer peripheral edges of the sheet-shaped vehicle body side panel and driver side panel, and gaps (non-joining regions) between the joining portions, which are configured by joining the outer peripheral edges to each other, are configured as the gas outlet ports for letting out the expansion gas. Therefore, compared to the rectifying member of the related art, which has a three-dimensional shape on a vehicle body side member, the configuration can be simplified, and it is also possible to suppress the bulkiness of the rectifying member when it is folded and accommodated together with the bag body. Therefore, the airbag can be folded compactly.

Therefore, in the steering wheel airbag device of the present invention, the rectifying member arranged inside can be simply configured, and thus the airbag can be compactly accommodated in the accommodation portion.

Further, in the steering wheel airbag device of the present invention, three gas outlet ports of the rectifying member are arranged so that the expansion gas can flow out substantially along the ring surface of the ring portion on the left, right, and rear three sides of the steering wheel in the straight-ahead steering state. That is, in the steering wheel airbag device of the present invention, in an initial stage of expansion of the airbag, the expansion gas discharged from the inflator does not flow to the driver side in the bag body, and flows out substantially along the ring surface. Therefore, for example, when the steering wheel airbag device is operated in a state where a driver sits close to the steering wheel, the bag body does not directly press the driver upward at the initial stage of expansion, and the bag body is to be widely unfolded along the ring surface of the steering wheel so as to allow expansion gas to flow into the inside and first enter between the driver and the steering wheel. At the initial stage of the expansion of the bag body, the expansion gas discharged from the inflator flows into the bag body from the gas outlet port in the rectifying member toward the rear in a region on the rear side of the bag body. Therefore, the bag body can be quickly entered between an abdominal portion of the driver and the ring portion, and thus the abdominal portion of the driver can be quickly protected. Further, in a region on the front side of the bag body, the expansion gas discharged from the inflator flows in from the gas outlet ports in the rectifying member toward the left and the right. That is, it is possible to suppress the expansion gas discharged from the inflator from flowing forward from the rectifying member into the bag body. Therefore, even when the driver is sitting with a head portion close to the steering wheel, the bag body protrudes so as to shift to the left and right sides of the head portion of the driver, and thus it is possible to suppress the expansion of the bag body so as to protrude directly toward the head portion of the driver, and to suppress the pressing of the head portion so as to bend backward. Therefore, in the steering wheel airbag device of the present invention, even when the driver is sitting close to the steering wheel, the rectifying member can accurately control the inflow of the expansion gas into the bag body, and the expanding airbag can smoothly protect the driver.

In the steering wheel airbag device of the present invention, the rectifying member may be configured to arrange the joining portion in an area on a free space side protruding from the accommodation portion when the bag body is unfolded and expanded. It is preferable in that, when the bag body is unfolded and expanded, the gas outlet port will be arranged in the area on the free space side protruding from the accommodation portion, and the expansion gas discharged from the gas outlet port can be stably discharged so as to be further substantially along the ring surface without being affected by the accommodation portion.

In the steering wheel airbag device of the present invention, the driver side panel may be configured such that a distance from a substantially center in a flatly unfolded state to a scheduled joining portion for forming the joining portion is set to be larger than a distance from a substantially center of the vehicle body side panel in a flatly unfolded state to a scheduled joining portion for forming the joining portion. It is preferable in that the inflow opening, that is, the driver side of the opening portion in the vehicle body side panel can be widely covered by the driver side panel, and the expansion gas flowing in from the inflow opening can be accurately deflected by the driver side panel which widely covers the driver side, and thus the expansion gas can be more stably discharged via the gas outlet port so as to substantially follow the ring surface.

In the steering wheel airbag device of the present invention, the non-joining region side edge portion in the driver side panel may be configured in a shape where, in a state where the driver side panel is flatly unfolded, two arcs recessed inward from a straight line connecting terminals of the joining portions on both sides are arranged side by side so as to lengthen a circumference. It is preferable in that, in the rectifying member in the expanded state by inflowing the expansion gas flowing from the inflow opening (opening portion) into the inside, it is possible to prevent the non-joining region side edge portions forming the peripheral edges of the gas outlet ports from hanging downward so as to narrow the openings of the gas outlet ports, and therefore the gas outlet port can be wide open, and thus the expansion gas can be quickly discharged from the gas outlet port into the bag body.

In the steering wheel airbag device of the present invention, the joining portion may be formed in a substantially straight-line shape on the outer peripheral edge side of the vehicle body side panel which is flatly unfolded. It is preferable in that it is possible to suppress the accumulation of the expansion gas in a vicinity of the joining portion once, and it is possible to discharge the expansion gas from the gas outlet port more quickly.

In the steering wheel airbag device of the present invention, the rectifying member may be configured such that an opening area of a rear gas outlet port through which the expansion gas can flow out to the rear is set to be larger than a sum of opening areas of a left gas outlet port through which the expansion gas can flow out to the left and a right gas outlet port through which the expansion gas can flow out to the right. In the initial stage of expansion of the airbag, the expansion gas can flow into the region on the rear end side of the bag body more quickly, and thus the bag body can be made to enter between the abdominal portion of the driver and the ring portion more quickly.

DETAILED DESCRIPTION OF THE INVENTION

Figure 1:
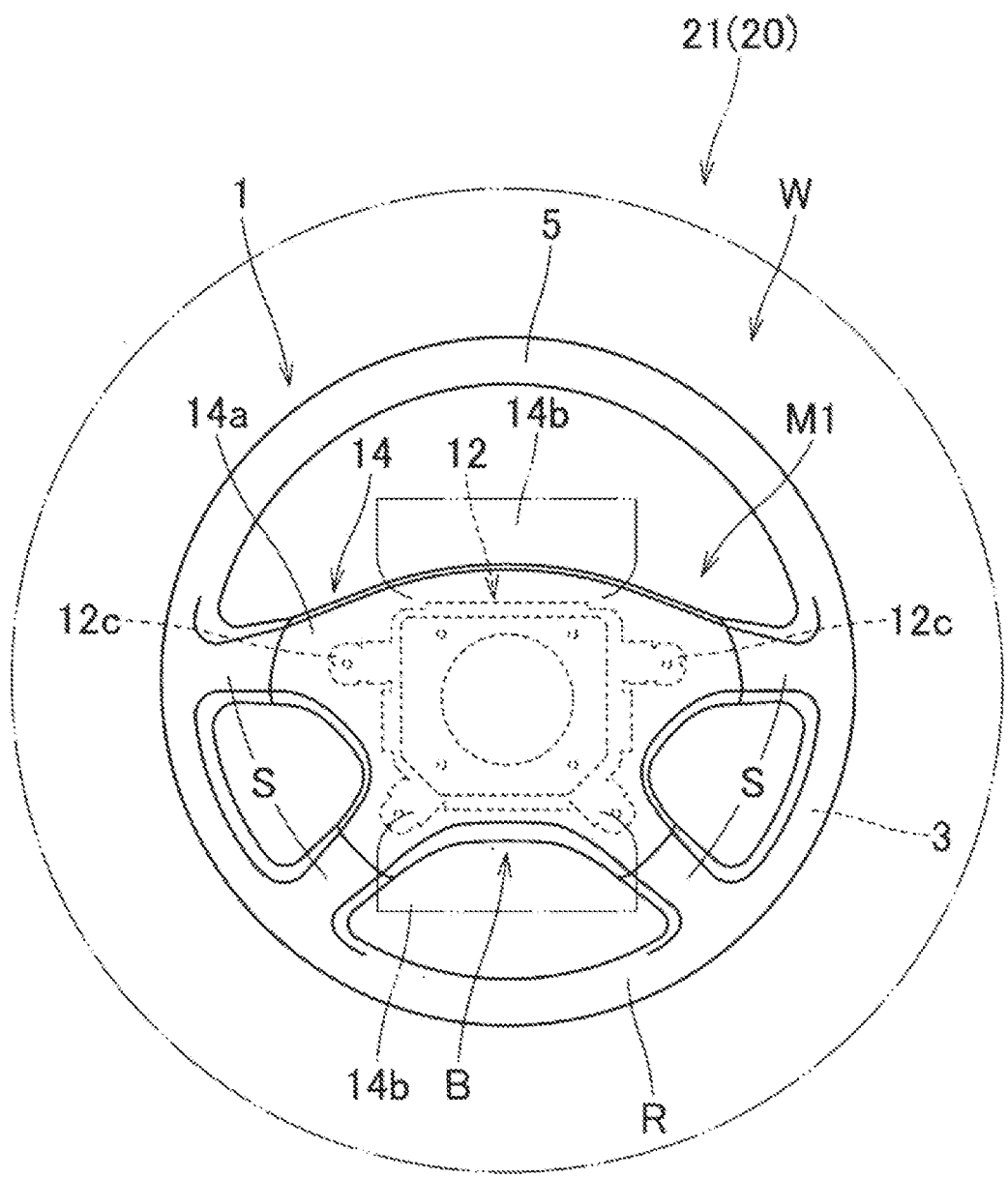
FIG. 1 is a schematic plan view illustrating a steering wheel airbag device according to a first embodiment of the present invention.
Figure 2:
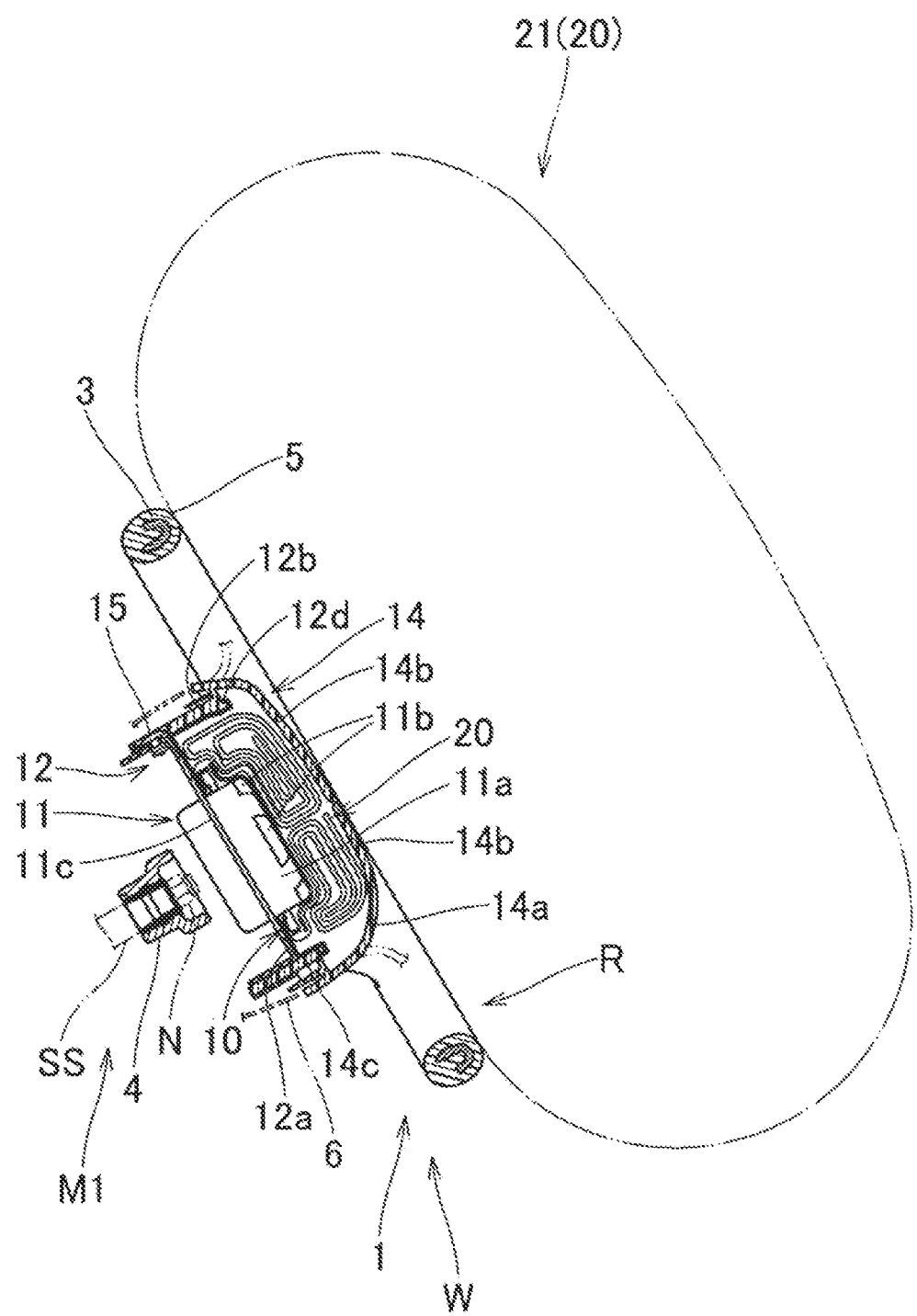
FIG. 2 is a schematic vertical cross-sectional view of the steering wheel airbag device according to the first embodiment when mounted on a vehicle.

Hereinafter, an embodiment of the present invention will be described with reference to the drawings. In the first embodiment, first, a steering wheel airbag device (hereinafter, abbreviated as "airbag device") M1 mounted on a steering wheel W having a ring portion R with a substantially annular shape as illustrated in FIGS. 1 and 2 will be described. The steering wheel W includes a steering wheel body 1 and the airbag device M1 arranged above a boss portion B in a center of the steering wheel body 1. The steering wheel body 1 has the ring portion R with a substantially annular shape which is gripped when a vehicle is steered, the boss portion B which is arranged substantially in the center of the ring portion R and is connected to a shaft SS, and a plurality of (four in the case of the embodiment) spoke portions S connecting the boss portion B and the ring portion R. In the embodiment, front-rear, up-down, and left-right directions are based on a straight-ahead steering state of the steering wheel W mounted on the vehicle unless otherwise specified. The front-rear, up-down, and left-right directions are shown such that an up-down direction along an axial direction of the shaft SS (see FIG. 2) to which the steering wheel W is assembled is set as the up-down direction, and a front-rear direction of the vehicle, which is orthogonal to an axis of the shaft SS, is set as the front-rear direction, and further a left-right direction of the vehicle, which is orthogonal to the axis of the shaft SS, is set as the left-right direction.

As illustrated in FIGS. 1 and 2, the steering wheel body 1 is arranged so as to connect each portion of the ring portion R, the boss portion B, and the spoke portion S, and includes a core metal 3 made of a metal such as an aluminum alloy. A coating layer 5 made of synthetic resin is coated on a portion of the ring portion R in the core metal 3 and a portion on the ring portion R side in each spoke portion S. Further, a boss 4 made of steel for inserting the shaft SS and fixing a nut N is arranged at a portion of the boss portion B in the core metal 3. Further, a lower cover 6 made of synthetic resin which covers a lower part of the boss portion B is arranged at a lower portion of the steering wheel body 1.

As illustrated in FIGS. 1 and 2, the airbag device M1 is arranged in the boss portion B located near the center (substantially the center) of the ring portion R in the steering wheel W. The airbag device M1 includes an airbag 20 which is folded and accommodated, an inflator 11 which supplies expansion gas to the airbag 20, a case 12 (bag holder) as a accommodation part for accommodating and holding the airbag 20 and the inflator 11, an airbag cover 14 which covers the folded airbag 20, and a retainer 10 for attaching the airbag 20 and the inflator 11 to the case 12.

As illustrated in FIG. 2, the inflator 11 includes a body portion 11a with a substantially columnar shape having a plurality of gas discharge ports 11b, and a flange portion 11c for attaching the inflator 11 to the case 12. The flange portion 11c is formed with a through hole (not illustrated) for passing each bolt (not illustrated) of the retainer 10.

The case 12 (bag holder) as the accommodation part is made of sheet metal, and as illustrated in FIG. 2, includes a bottom wall portion 12a with a substantially rectangular shape to which the inflator 11 is inserted from below and attached, and a peripheral wall portion 12b extending vertically from an outer peripheral edge of the bottom wall portion 12a. An attachment piece 12c extending outward is formed on an upper end 12d of the peripheral wall portion 12b (see FIG. 1), and an attachment board of a horn switch mechanism (not illustrated) is attached to the attachment piece 12c. Then, using this attachment board (not illustrated), the case 12 is attached and fixed to the core metal 3 of the steering wheel W. and the airbag device M1 is mounted on an upper part of the boss portion B of the steering wheel body 1 already mounted on the shaft SS. Further, a side wall portion 14c of the airbag cover 14 is attached to the peripheral wall portion 12b of the case 12 by using a rivet 15 or the like (see FIG. 2). In the case of the embodiment, the airbag 20 and the inflator 11 are attached to the bottom wall portion 12a of the case 12 by using a bolt (not illustrated) of the retainer 10 arranged in a rectifying member 32 of the airbag 20 as attachment means, inserting this bolt (not illustrated) into attachment holes 25 and 40 on a peripheral edge of an inflow opening 24 (an opening portion 39 of the rectifying member 32 described below), which will be described below, of a bag body 21 in the airbag 20, making the bolt penetrate the bottom wall portion 12a of the case 12 and the flange portion 11c of the inflator 11, and then fixing them with nuts (not illustrated).

The airbag cover 14 is made of synthetic resin, and includes a ceiling wall portion 14a which covers an upper part of the airbag 20 accommodated in the case 12, and the side wall portion 14c having a substantially square cylinder shape which extends downward from a vicinity of the outer peripheral edge of the ceiling wall portion 14a. The ceiling wall portion 14a is formed with two door portions 14b and 14b which are pushed by the expanding airbag 20 and open back and forth.

Figure 3:
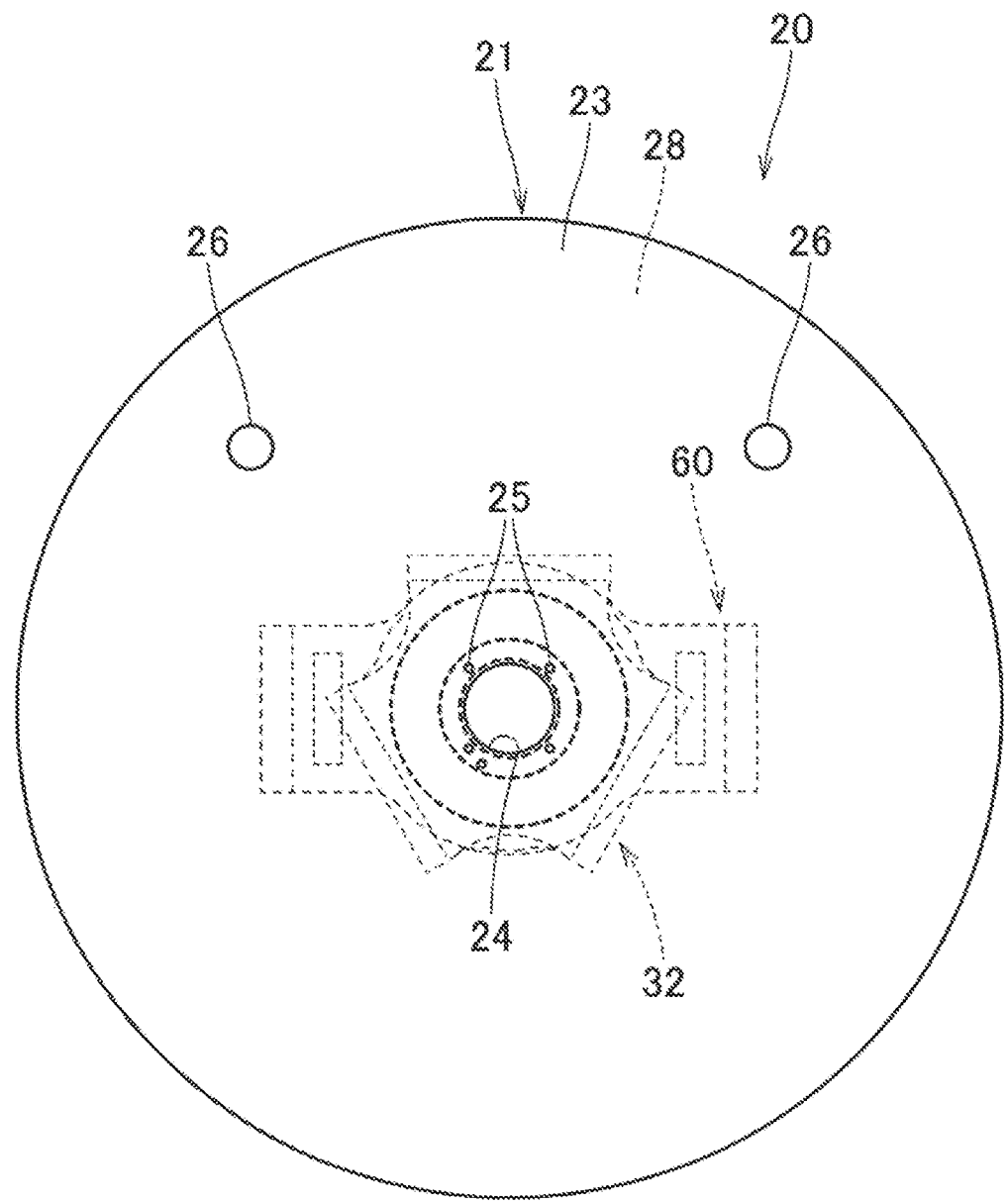
FIG. 3 is a bottom view illustrating a state in which an airbag used in the steering wheel airbag device of the first embodiment is flatly unfolded.
Figure 4:
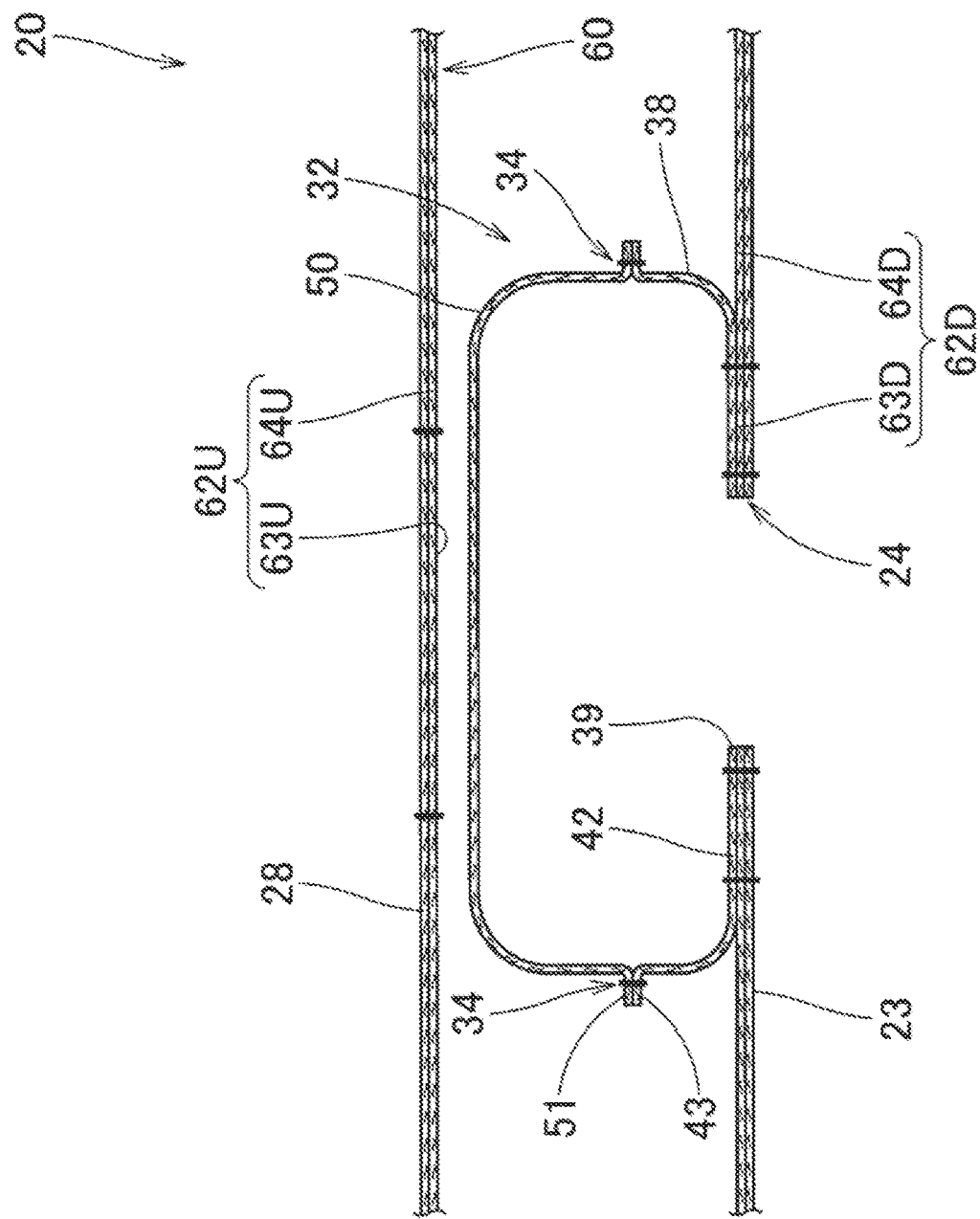
FIG. 4 is a partially enlarged cross-sectional view of the airbag of FIG. 3.

As illustrated in FIGS. 3 and 4, the airbag 20 is configured to include a bag body 21 having a bag shape, the rectifying member 32 arranged in the bag body 21, and a tether 60 which regulates a completed expansion shape of the bag body 21.

Figure 5:
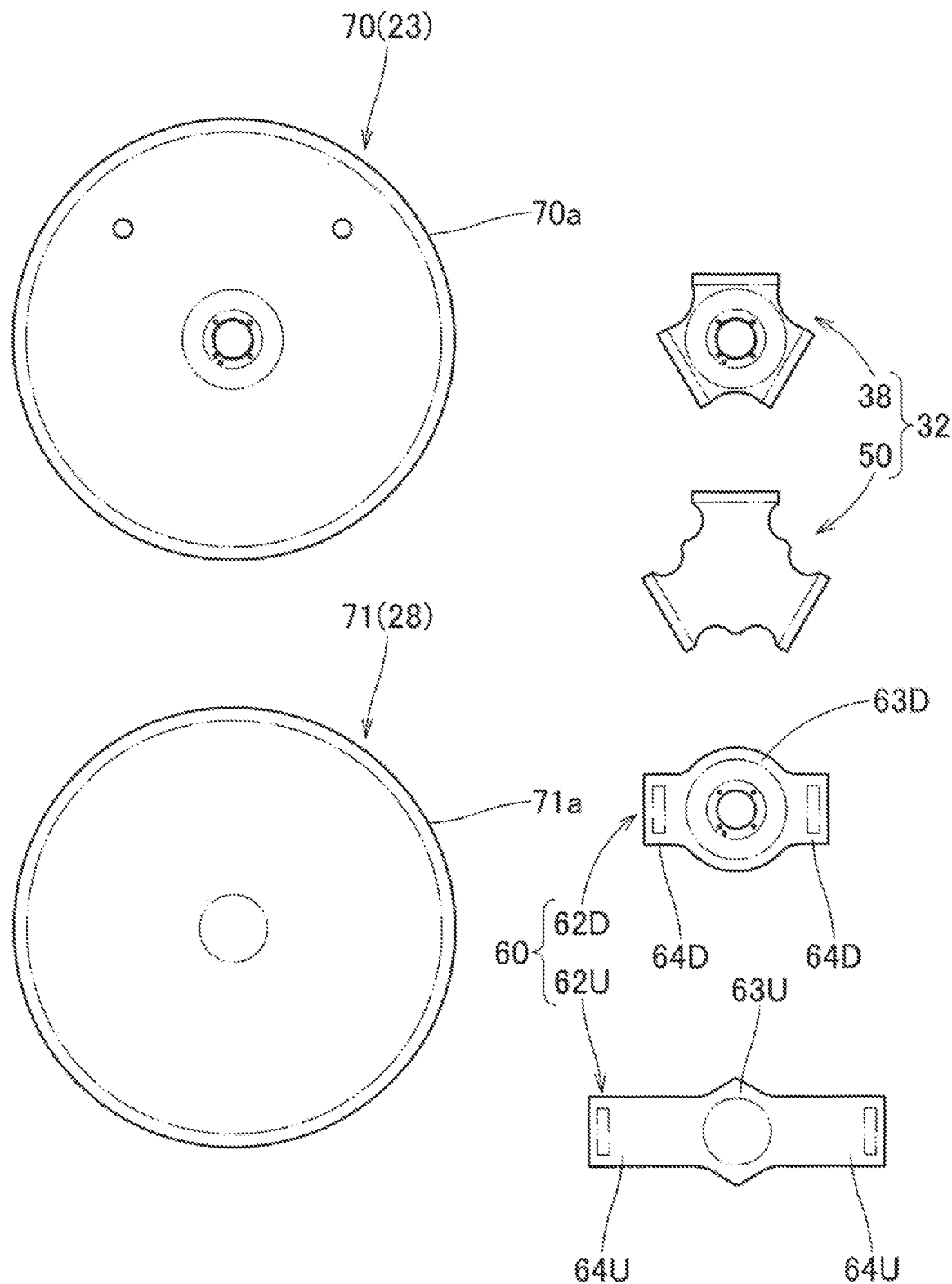
FIG. 5 is a plan view illustrating a state in which base materials forming the airbag of FIG. 3 are arranged side by side.
Figure 11:
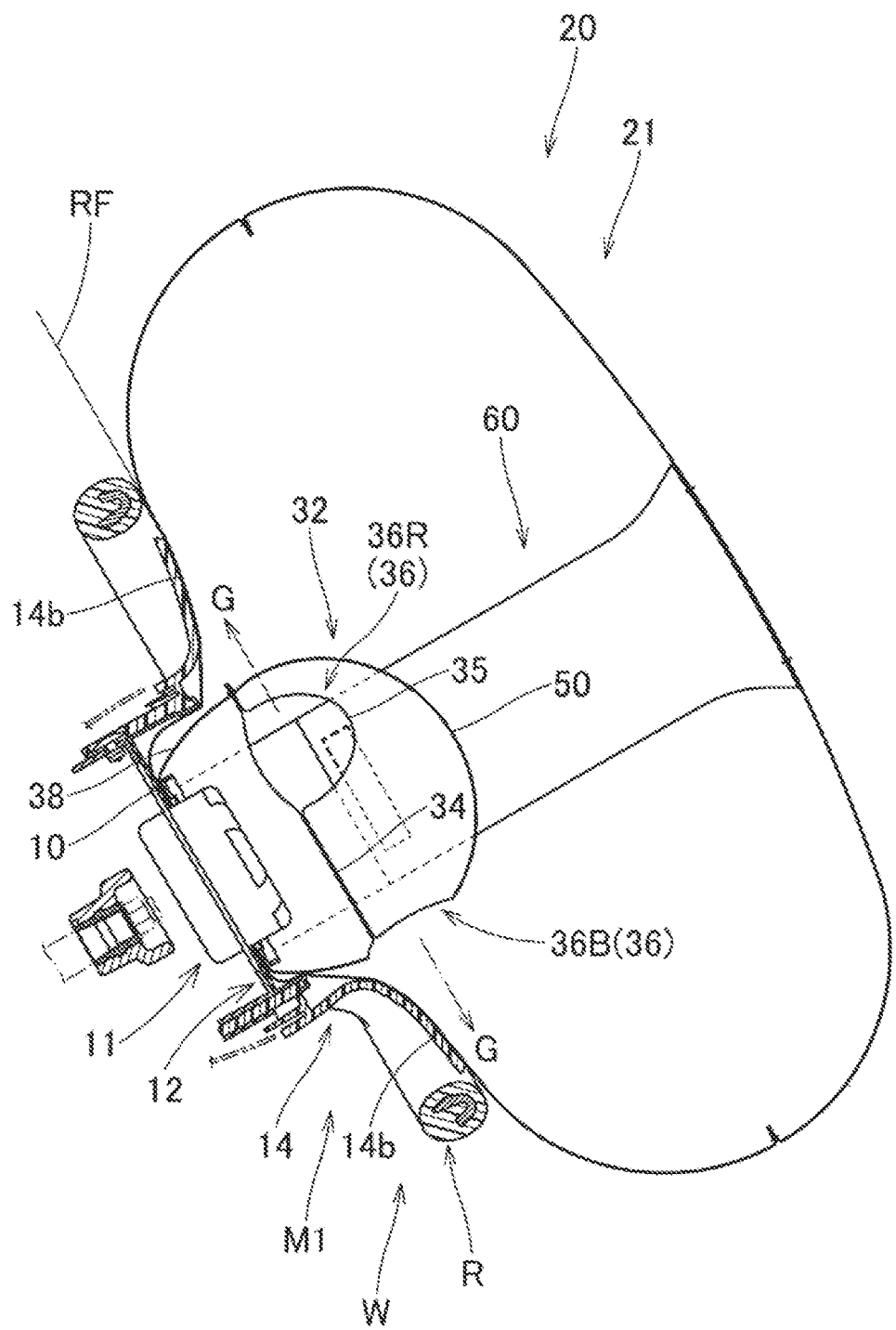
FIG. 11 is a schematic vertical cross-sectional view illustrating a state in which the airbag has completed expansion in the steering wheel airbag device according to the first embodiment.

The bag body 21 is configured such that the completed expansion shape is, as shown in the two-dot chain line in FIGS. 1 and 2 and FIG. 11, a substantially circular shape which can cover the entire ring portion R when viewed from above, and a substantially elliptical spherical shape when viewed from the side so that, when the expansion is completed, an upper surface side of the steering wheel W can be covered over almost the entire surface. As illustrated in FIGS. 3 and 4, the bag body 21 includes a driver side wall portion 28 arranged on the driver MD side when expansion is completed, and a vehicle body side wall portion 23 arranged on the steering wheel W side. As illustrated in FIG. 5, the bag body 21 has a bag shape by joining outer peripheral edges 70a and 71a of a driver side panel 71 and a vehicle body side panel 70, which have a substantially circular shape with substantially the same external shape, to each other. The driver side panel 71 and the vehicle body side panel 70 forming the bag body 21 are formed of a flexible woven fabric made of polyamide yarn, polyester yarn, or the like.

In the bag body 21, the inflow opening 24 capable of inflowing an expansion gas G into the inside is formed by opening in a circular shape at substantially the center of the vehicle body side wall portion 23, as illustrated in FIG. 3. This inflow opening 24 is for inserting the body portion 11a of the inflator 11 from below, and four attachment holes 25 for inserting bolts (not illustrated) formed in the retainer 10 are formed on a peripheral edge of the inflow opening 24. Further, in the vehicle body side wall portion 23 of the bag body 21, a vent hole 26 for exhausting an excess expansion gas which has flowed into the inside is formed.

The rectifying member 32 is arranged in the bag body 21 so as to cover the inflow opening 24 (see FIG. 4), and rectifies the expansion gas discharged from the inflator 11 and causes the rectified expansion gas to flow out into the bag body 21. The rectifying member 32 is configured to include three gas outlet ports 36 (a left gas outlet port 36L, a right gas outlet port 36R, and a rear gas outlet port 36B) such that the expansion gas G discharged from the inflator 11 can flow out substantially along a ring surface RF (an upper surface of the ring portion R) of the ring portion R and flow out to the left, right, and rear three sides in the straight-ahead steering state of the steering wheel W. In the case of the embodiment, the rectifying member 32 is configured by partially joining (sewing) outer peripheral edges 43 and 51 of a vehicle body side panel 38 arranged on the steering wheel W side and a driver side panel 50 arranged on the driver MD side, both panels being formed from sheet bodies having flexibility. The rectifying member 32 is configured so as to arrange such joining portions 34 (a front joining portion 34F, a rear left joining portion 34L, and a rear right joining portion 34R) for joining corresponding edges of the vehicle body side panel 38 and the driver side panel 50 to each other and gas outlet ports 36 (the left gas outlet port 36L, the right gas outlet port 36R, and the rear gas outlet port 36B) composed of non-joining regions 35 between the joining portions 34 on the outer peripheral edge 32a side (see FIGS. 4 and 6). The driver side panel 50 and the vehicle body side panel 38 forming the rectifying member 32 are formed of a flexible woven fabric made of polyamide yarn, polyester yarn, or the like, similarly to the bag body 21.

Figure 6:
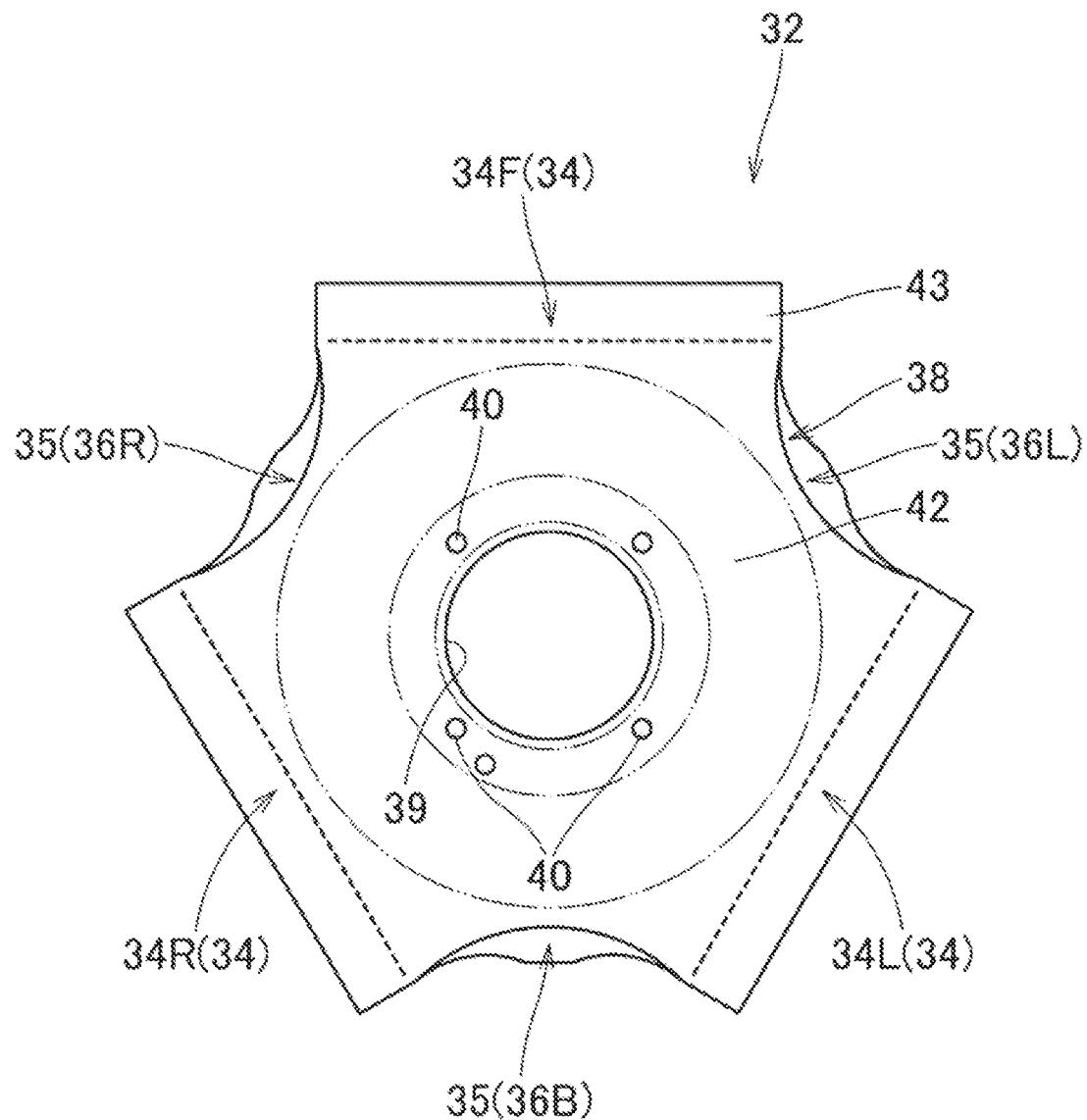
FIG. 6 is a bottom view of a rectifying member in the airbag of FIG. 3.

In the case of the embodiment, the vehicle body side panel 38 arranged on the steering wheel W side has a substantially hexagonal external shape in which a front edge is substantially aligned in the left-right direction in the flatly unfolded state (see FIGS. 5, 6, and 7A), and includes the opening portion 39 corresponding to the inflow opening 24 of the bag body 21 and a flat surface portion 42 connected to the opening portion 39 (see FIGS. 4 and 6). The opening portion 39 is arranged at a position approximately at a center of the vehicle body side panel 38 in a flatly unfolded state. The rectifying member 32 of the embodiment is configured to sew a peripheral edge of the opening portion 39 to a peripheral edge of the inflow opening 24 of the bag body 21 together with an attachment side portion 63D of a tether base material 62D forming the tether 60 described below, and then attach the peripheral edge of the opening portion 39 to the case 12 together with the peripheral edge of the inflow opening 24 by using the retainer 10 (see FIG. 4). Then, on the peripheral edge of the opening portion 39, the attachment hole 40 through which the bolt (not illustrated) of the retainer 10 can be inserted is formed corresponding to the attachment hole 25 formed in the bag body 21. In addition, the vehicle body side panel 38 is configured such that three joining portions 34 joined to the corresponding outer peripheral edge 51 of the driver side panel 50 and three non-joining regions 35 between the joining portions 34 are arranged on the outer peripheral edge 43 side (an outer peripheral edge side of the vehicle body side panel 38 itself) of the flat surface portion 42. That is, in a state where the vehicle body side panel 38 is not joined with the driver side panel 50, the outer peripheral edge 43 of the vehicle body side panel 38 is configured to include three joining portion side edge portions 45 (45F, 45L, and 45R) from which the joining portions 34 will be formed, and three non-joining region side edge portions 47 (47B, 47L, and 47R) forming the non-joining regions 35 (that is, the edge portions of the gas outlet ports 36)(see FIGS. 6 and 7A).

Figure 7A:
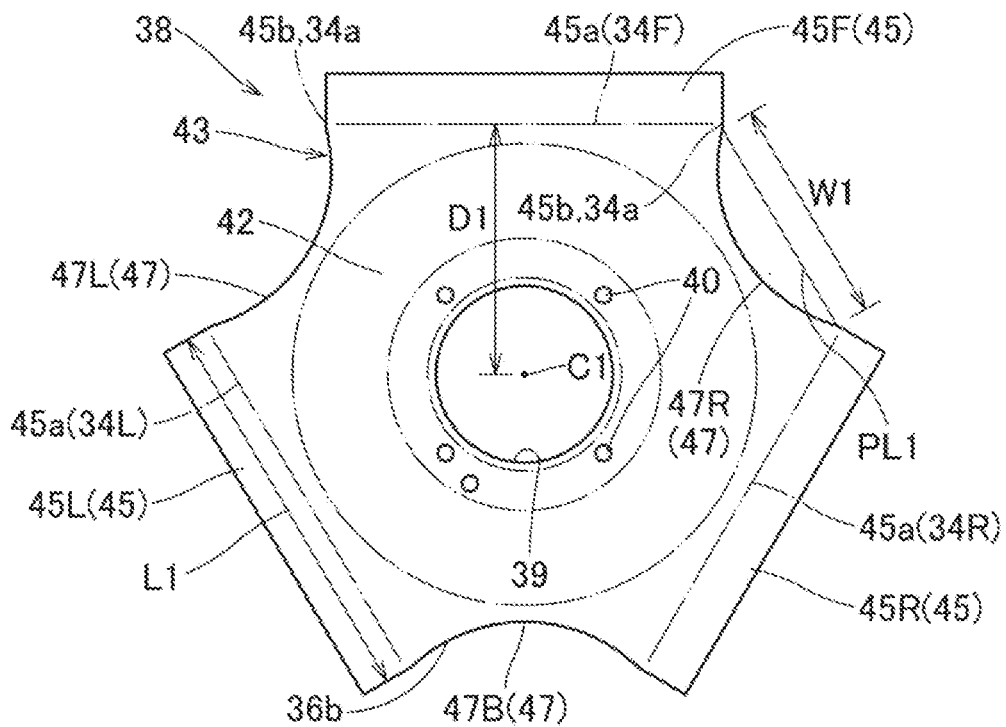
FIGS. 7A and 7B are plan views in which a vehicle body side panel and a driver side panel forming the rectifying member of FIG. 6 are arranged side by side.

As illustrated in FIG. 7A, on the outer peripheral edge 43 of the vehicle body side panel 38, the joining portion side edge portions 45 (45F, 45L, and 45R) are composed of a front side where the front joining portion 34F will be formed, and a rear left side and a rear right side where the rear left joining portion 34L and the rear right joining portion 34R will be formed. Each of the joining portion side edge portions 45 is formed in a substantially straight-line shape. Specifically, in a state where the vehicle body side panel 38 is unfolded flatly, the joining portion side edge portion 45F on the front side is formed as a substantially straight line shape substantially along the left-right direction, and the joining portion side edge portions 45L and 45R on the rear left side and the rear right side are respectively formed as substantially straight line shapes inclined with respect to the front-rear direction. In the embodiment, the joining portion side edge portions 45F, 45L, and 45R have a substantially point-symmetrical shape with respect to a center point C1 which is a center (a center of the front, rear, left, and right in the vehicle body side panel 38) of the opening portion 39, and a width dimension (length dimension L1) is set to be the same (see FIG. 7A).

The non-joining region side edge portions 47 (47B, 47L, and 47R) are composed of regions between the joining portion side edge portions 45 (45F, 45L, and 45R). That is, specifically, the non-joining region side edge portions 47 (47B, 47L, and 47R) are composed of a rear region, a front left region, and a front right region, in the outer peripheral edge 43 of the vehicle body side panel 38 in the flatly unfolded state. Each of the non-joining region side edge portion 47 (47B, 47L, and 47R) forms a lower edge 36b side at a peripheral edge of an opening of each of the gas outlet ports 36 (the left gas outlet port 36L, the right gas outlet port 36R, and the rear gas outlet port 36B) (see FIG. 8). In the case of the embodiment, the non-joining region side edge portions 47 (47B, 47L, and 47R) have a substantially point-symmetrical shape with respect to the center point C1. In detail, as illustrated in FIG. 7A, in a state where the vehicle body side panel 38 is unfolded flatly, each of the non-joining region side edge portions 47 (47B, 47L, and 47R) is curved in a substantially arcuate shape so as to be recessed inward from a straight line PL1 connecting terminals 45b and 45b of the joining portions 34 (scheduled joining portions 45a) on both sides. In the case of the embodiment, width dimension W1 (a length dimension of the straight line PL1 described above) of each of the non-joining region side edge portions 47 (47B, 47L, and 47R) is set to be smaller than the length dimension L1 of the joining portion side edge portion 45 (see FIG. 7A).

Figure 7B:
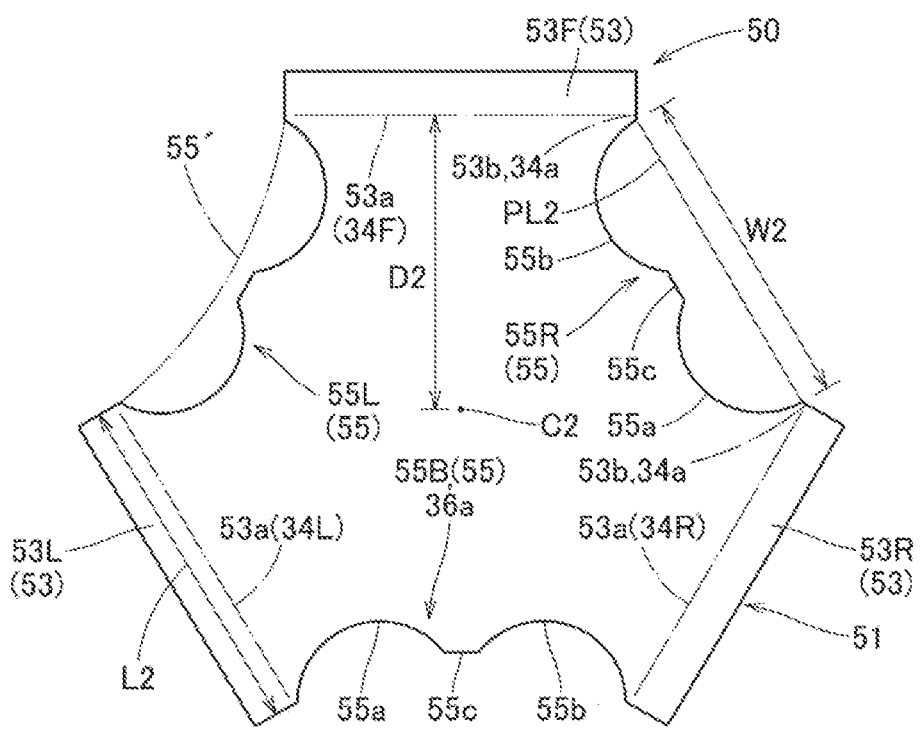

In the case of the embodiment, the driver side panel 50 arranged on the driver MD side is formed such that the external dimension of the driver side panel 50 is set larger than that of the vehicle body side panel 38 (see FIG. 5), and the external shape of the driver side panel 50 in a flatly unfolded state is a substantially hexagonal shape with a front edge substantially along the left-right direction. As illustrated in FIG. 7B, the outer peripheral edge 41 of the driver side panel 50 is configured to include, corresponding to the joining portion side edge portions 45 (45F, 45L, and 45R) and non-joining region side edge portions 47 (47B, 47L, and 47R) formed on the outer peripheral edge 43 of the vehicle body side panel 38, three joining portion side edge portions 53 (53F, 53L, and 53R) for forming the joining portions 34, and three non-joining region side edge portions 55 (55B, 55L, and 55R) forming the non-joining regions 35 (that is, the edge portions of the gas outlet ports 36).

As illustrated in FIG. 7B, on the outer peripheral edge 51 of the driver side panel 50, the joining portion side edge portions 53 (53F, 53L, and 53R) are composed of a front side where the front joining portion 34F will be formed, and a rear left side and a rear right side where the rear left joining portion 34L and the rear right joining portion 34R will be formed. Each of the joining portion side edge portions 53 is formed in a substantially straight-line shape. Specifically, in a state where the driver side panel 50 is unfolded flatly, the joining portion side edge portion 53F on the front side is formed as a substantially straight line shape substantially along the left-right direction, and the joining portion side edge portions 53L and 53R on the rear left side and the rear right side are respectively formed as substantially straight line shapes inclined with respect to the front-rear direction. In the embodiment, the joining portion side edge portions 53F, 53L, and 53R have a substantially point-symmetrical shape with respect to a center point C2 which is a center of front, rear, left, and right in the driver side panel 50 in the flatly unfolded state, and a width dimension (length dimension L2) is set to be the same. Further, the joining portion side edge portions 53 (53F, 53L, and 53R) are set so that the width dimension (length dimension L2) is substantially the same as the width dimension (length dimension L1) of the joining portion side edge portion 45 (45F, 45L, and 45R) of the vehicle body side panel 38 (see FIGS. 7A and 7B).

The non-joining region side edge portions 55 (55B, 55L, and 55R) are composed of regions between the joining portion side edge portions 53 (53F, 53L, and 53R) as illustrated in FIG. 7B. That is, specifically, the non-joining region side edge portions 55 (55B, 55L, and 55R) are composed of a rear region, a front left region, and a front right region, in the outer peripheral edge 51 of the driver side panel 50 in the flatly unfolded state. Each of the non-joining region side edge portion 55 (55B, 55L, and 55R) forms an upper edge 36a side at a peripheral edge of an opening of each of the gas outlet ports 36 (the left gas outlet port 36L, the right gas outlet port 36R, and the rear gas outlet port 36B)(see FIG. 8). The non-joining region side edge portions 55 (55B, 55L, and 55R) have a substantially point-symmetrical shape with respect to the center point C2. In a state where the driver side panel 50 is flatly unfolded, each of the non-joining region side edge portions 55 (55B, 55L, and 55R) is configured so that two arcs recessed inward from a straight line PL2 connecting terminals 53b and 53b of the joining portions 34 (scheduled joining portions 53a) on both sides are arranged side by side so as to have along circumference. In detail, as illustrated in FIG. 7B, the non-joining region side edge portion 55 is configured to have two curved portions 55a and 55b with a substantially arcuate shape which are recessed inward, and a connecting portion 55c with a substantially straight line shape which connects the curved portions 55a and 55b, and is configured so that the connecting portion 55c is located further on an inner side than the straight line PL2. For each non-joining region side edge portion 55, a width dimension W2 (a length dimension of the straight line PL2 described above) is set larger than the width dimension W1 of the non-joining region side edge portion 47 in the vehicle body side panel 38. Specifically, the width dimension W2 is set to about ⅗ of the width dimension W1 of the non-joining region side edge portion 47 (see FIGS. 7A and 7B). Further, in the case of the embodiment, the width dimension W2 of each non-joining region side edge portion 55 is set to be larger than the length dimension L2 of the joining portion side edge portion 53.

The external dimension of the driver side panel 50 is set to be larger than that of the vehicle body side panel 38. In detail, a distance D2 from the substantially center (center point C2) of the driver side panel 50 in the flatly unfolded state to the scheduled joining portion 53a where the joining portion 34 is formed is configured to have a larger dimension than a distance D1 from the center (a center (center point C1) of the opening portion 39) in the flatly unfolded state to the scheduled joining portion 45a (see FIGS. 7A and 7B). In particular, the distance D2 from the center point C2 to the scheduled joining portion 53a in the driver side panel 50 is set to about ⅘ of the distance D1 from the center point C1 to the scheduled joining portion 45a in the vehicle body side panel 38. Further, in the rectifying member 32 of the embodiment, the distance D1 from the center point C1 to the scheduled joining portion 45a (joining portion 34) in the vehicle body side panel 38 is set to a dimension in which the joining portion 34 is placed in an area (above the upper end 12d of the peripheral wall portion 12b in the case 12) on a free space side protruding from the case 12 when the bag body 21 is unfolded and expanded (see FIGS. 11 and 12).

By overlapping the joining portion side edge portions 45 (45F, 45L, and 45R) on the vehicle body side panel 38 and the corresponding joining portion side edge portions 53 (53F, 53L, and 53R) on the driver side panel 50, respectively, and sewing the portions of the scheduled 30 joining portions 45a and 53a with sutures, the joining portions 34 (the front joining portion 34F, the rear left joining portion 34L, and the rear right joining portion 34R) having a substantially straight line shape are formed, in such a manner that the rectifying member 32 of the embodiment can be manufactured (see FIG. 6). In the rectifying member 32, three gas outlet ports 36 (the rear gas outlet port 36B, the left gas outlet port 36L, and the right gas outlet port 36R) are composed of portions of the non-joining regions 35 between the joining portions 34. Further, in the rectifying member 32 of the embodiment, the non-joining region side edge portions 47 (47B, 47L, and 47R), 55 (55B, 55L, and 55R) forming the non-joining regions 35 have a substantially point-symmetrical shape centered on the center points C1 and C2 in the vehicle body side panel 38 and the driver side panel 50. In other words, the three gas outlet ports 36 (the rear gas outlet port 36B, the left gas outlet port 36L, and the right gas outlet port 36R) are configured so that the outer shapes are set to be substantially the same and the opening areas are substantially the same.

The tether 60, which regulates the completed expansion shape of the bag body 21, is arranged so as to connect the peripheral edge of the inflow opening 24 in the vehicle body side wall portion 23 and a vicinity of the center of the driver side wall portion 28, and regulates a separation distance between the vicinity of the center of the driver side wall portion 28 and the peripheral edge of the inflow opening 24 when the expansion is completed. In the case of the embodiment, the tether 60 is formed at two locations on the left and right sides of the inflow opening 24. The tether 60 is composed of two tether base materials 62U and 62D as illustrated in FIG. 5. Each of the tether base material 62U and 62D is configured to include attachment side portions 63U and 63D, which are joined to the vehicle body side wall portion 23 side and the driver side wall portion 28 side, and two tether components 64U and 64D extending from outer peripheral edges of the attachment side portions 63U and 63D. In a state where the attachment side portions 63U and 63D are joined to the vehicle body side wall portion 23 side and the driver side wall portion 28 side, the tether 60 is formed by connecting corresponding end portions of the tether components 64U and 64D to each other. The tether base materials 62U and 62D forming the tether 60 are formed of a flexible woven fabric made of polyamide yarn, polyester yarn, and the like, similarly to the bag body 21 and the rectifying member 32.

Next, the manufacture of the airbag 20 of the embodiment will be described. By overlapping the attachment side portion 63D of the tether base material 62D and the vehicle body side panel 38 of the rectifying member 32 on the vehicle body side panel 70, sewing them with suture at the portion which will form the peripheral edge of the inflow opening 24, and performing drilling work on them, the inflow opening 24 (opening portion 39) and the attachment hole 25 (40) are formed. The attachment side portion 63U of the tether base material 62U is sewn on the driver side panel 71. Next, by overlapping the driver side panel 50 forming the rectifying member 32 on the vehicle body side panel 38 of the rectifying member 32 sewn on the vehicle body side panel 70, and sewing (joining), at the portions of the scheduled joining portions 45a and 53a, the joining portion side edge portions 45 and 53 on the outer peripheral edge 43 and 51 sides with suture so as to form the joining portion 34, the rectifying member 32 is formed. Then, the vehicle body side panel 70 and the driver side panel 71 are overlapped in a flatly unfolded state while in contact with the outer surface side, and the outer peripheral edges 70a and 71a are sewn together using sutures, in such a manner that the bag body 21 having a bag shape can be formed. This bag body 21 is inverted by using the inflow opening 24 so as not to expose the seam margin to the outside, and then tips of the tether components 64U and 64D are joined to each other to form the tether 60, in such a manner that the airbag 20 can be manufactured.

The airbag 20 manufactured in this way can be mounted on a vehicle as follows. First, the airbag 20 is folded so as to be able to be accommodated in the case 12 with the retainer 10 arranged inside the rectifying member 32 so that a bolt (not illustrated) protrudes from the attachment hole 25. Next, the folded airbag 20 is accommodated in the case 12, and the body portion 11a of the inflator 11 is inserted from below, and then the inflator 11 and the airbag 20 are attached to the case 12 by using a bolt (not illustrated) protruding from the bottom wall portion 12a and a nut. Further, the case 12 is covered with the airbag cover 14, and the airbag cover 14 is attached to the case 12 by using the rivet 15 or the like, and then a horn switch mechanism (not illustrated) is attached to the attachment piece 12c of the case 12, in such a manner that the airbag device M1 can be assembled. The airbag device M1 is attached to the steering wheel body 1 previously fastened to the shaft SS by using an attachment board (not illustrated) of the horn switch mechanism, in such a manner that the airbag device M1 can be mounted on the vehicle at the same time as the steering wheel W is attached to the vehicle.

In the airbag device M1 of the first embodiment, when the expansion gas G is discharged from the gas discharge port 11b of the inflator 11, the airbag 20 inflows the expansion gas G into the inside and expands, pushes open the door portions 14b and 14b of the airbag cover 14, and protrudes from the case 12, and then as illustrated by the two-dot chain line of FIGS. 1 and 2 and FIG. 11, the airbag 20 completes the expansion so as to cover substantially the entire upper surface of the steering wheel W.

Then, in the airbag device M1 of the first embodiment, the rectifying member 32 arranged in the bag body 21 is configured by partially joining the outer peripheral edges 43 and 51 of the vehicle body side panel 38 and the driver side panel 50, which are made of a flexible sheet body, to each other. Specifically, the vehicle body side panel 38 forming the rectifying member 32 has a configuration in which three joining portions 34 joined to the corresponding outer peripheral edges of the driver side panel 50 and three non-joining regions 35 between the joining portions 34 are arranged on the outer peripheral edge 43 side of the flat surface portion 42 formed so as to be continuous from the opening portion 39 corresponding to the inflow opening 24 of the bag body 21. That is, in the airbag device M1 of the first embodiment, the rectifying member 32 is formed by partially joining only the outer peripheral edges 43 and 51 of the sheet-shaped vehicle body side panel 38 and driver side panel 50, and gaps (non-joining regions 35) between the joining portions 34, which are configured by joining the outer peripheral edges 43 and 51 to each other, are configured as the gas outlet ports 36 for letting out the expansion gas. Therefore, compared to the rectifying member of the related art, which has a three-dimensional shape on a vehicle body side member, the configuration can be simplified, and it is also possible to suppress the bulkiness of the rectifying member when it is folded and accommodated together with the bag body 21. Therefore, the airbag 20 can be folded compactly.

Therefore, in the airbag device M1 of the first embodiment, the rectifying member 32 arranged inside can be simply configured, and thus the airbag 20 can be compactly accommodated in the case 12 as an accommodation portion.

In the airbag device M1 of the first embodiment, the rectifying member 32 is configured to be manufactured by, at the time of manufacturing the bag body 21, overlapping the driver side panel 50 on the vehicle body side panel 38 and joining the corresponding edges to each other in a state where the vehicle body side panel 38 is connected to the vehicle body side panel 70 which forms the bag body 21. That is, in the airbag 20 of the airbag device M1 of the first embodiment, the rectifying member 32 is not manufactured in advance before the bag body 21 is manufactured, but can be manufactured at the same time as the bag body 21 is manufactured. Therefore, it is easy to manufacture, and it is possible to suppress an increase in manufacturing man-hours and manufacturing costs.

Figure 9A:
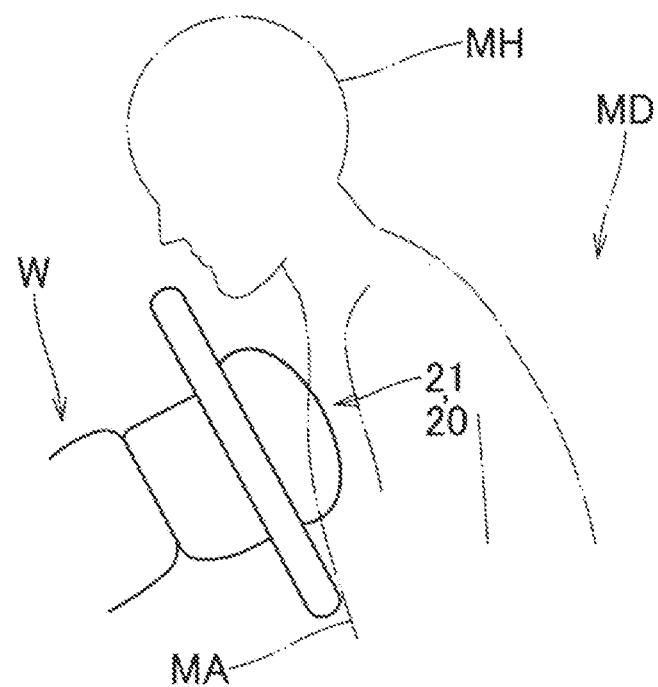
FIGS. 9A and 9B are schematic side views illustrating an airbag expansion process in the steering wheel airbag device according to the first embodiment.
Figure 9B:
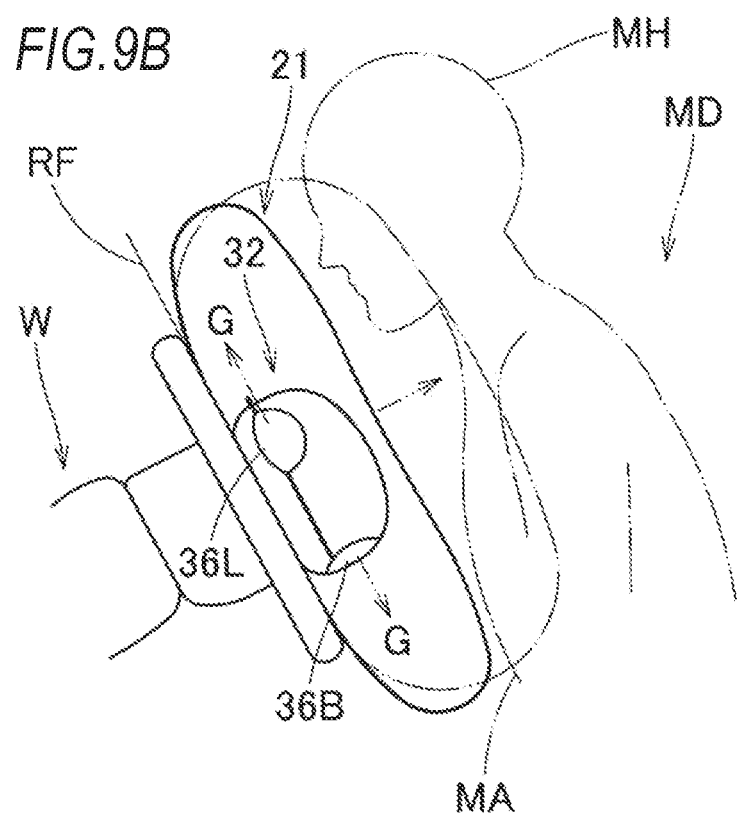
Figure 10:
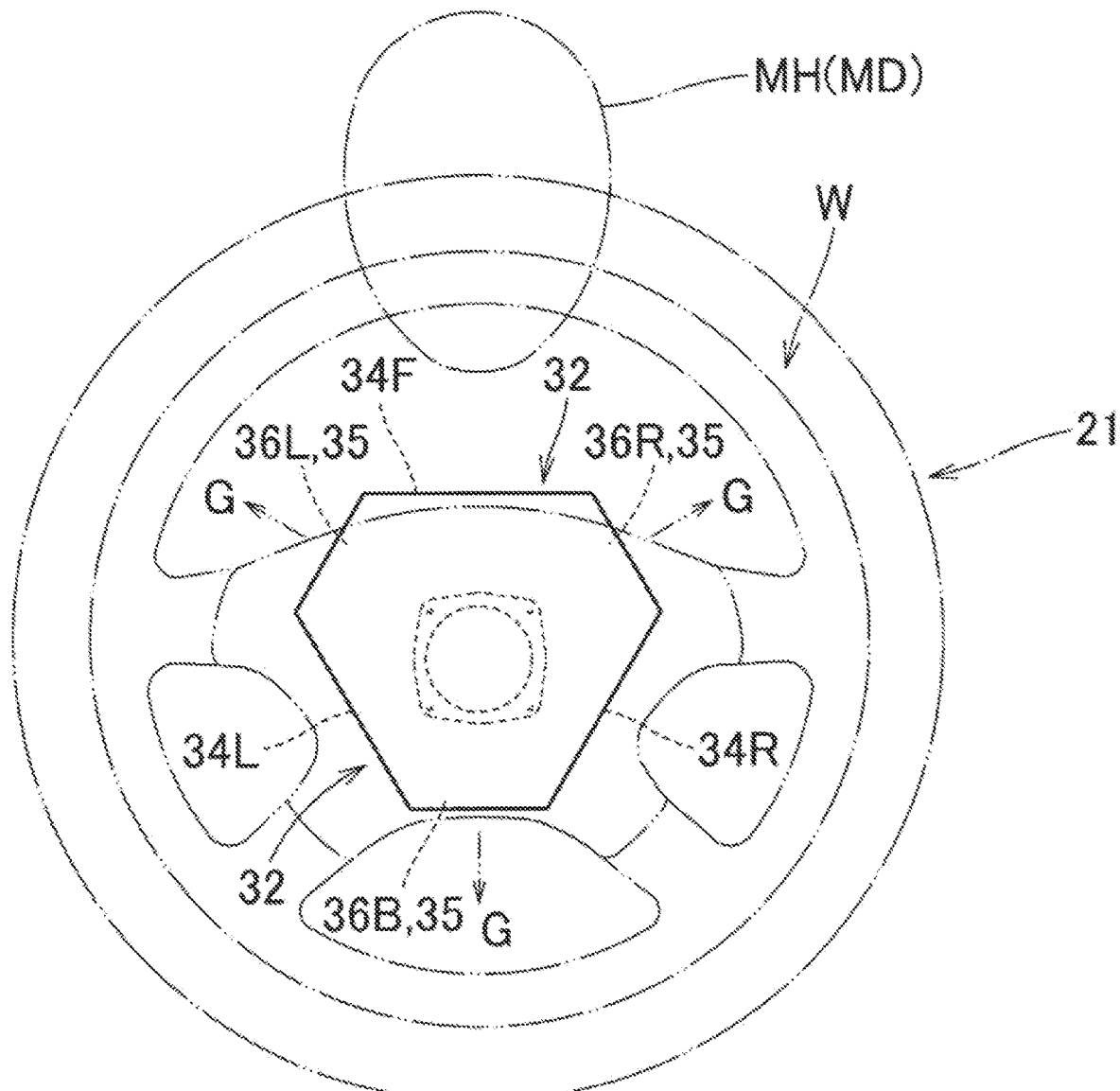
FIG. 10 is a schematic plan view illustrating an outflow of expansion gas from the rectifying member into a bag body in the steering wheel airbag device according to the first embodiment.

Further, in the airbag device M1 of the first embodiment, three gas outlet ports 36 of the rectifying member 32 are arranged so that the expansion gas G can flow out substantially along the ring surface RF of the ring portion R on the left, right, and rear three sides of the steering wheel W in the straight-ahead steering state. That is, in the airbag device M1 of the embodiment, in an initial stage of expansion of the airbag 20, the expansion gas G discharged from the inflator 11 does not flow to the driver MD side (upward so as to be substantially orthogonal to the ring surface RF) in the bag body 21, and flows out substantially along the ring surface RF. Therefore, for example, as illustrated in FIG. 9A, when the airbag device M1 is operated in a state where the driver MD sits close to the steering wheel W, the bag body 21 does not directly press the driver MD upward at the initial stage of expansion, and as illustrated in FIG. 9B, the bag body 21 is to be widely unfolded along the ring surface RF of the steering wheel W so as to allow expansion gas to flow into the inside and first enter between the driver MD and the steering wheel W. At the initial stage of the expansion of the bag body 21, the expansion gas G discharged from the inflator 11 flows into the bag body 21 from the rear gas outlet port 36B in the rectifying member 32 toward the rear in a region on the rear side of the bag body 21. Therefore, the bag body 21 can be quickly entered between an abdominal portion MA of the driver MD and the ring portion R, and thus the abdominal portion MA of the driver MD can be quickly protected. Further, in a region on the front side of the bag body 21, as illustrated in FIG. 10, the expansion gas G discharged from the inflator 11 flows in from the left gas outlet port 36L and the right gas outlet port 36R in the rectifying member 32 toward the left and the right. That is, it is possible to suppress the expansion gas G discharged from the inflator 11 from flowing forward from the rectifying member 32 into the bag body 21. Therefore, even when the driver MD is sitting with a head portion MH close to the steering wheel W, the bag body 21 protrudes so as to shift to the left and right sides of the head portion MH of the driver MD, and thus it is possible to suppress the expansion of the bag body 21 so as to protrude directly toward the head portion MH (specifically, below the chin) of the driver MD, and to suppress the pressing of the head portion MH so as to bend backward. Therefore, in the airbag device M1 of the embodiment, even when the driver MD is sitting close to the steering wheel W, the rectifying member 32 can accurately control the inflow of the expansion gas into the bag body 21, and the expanding airbag 20 can smoothly protect the driver MD.

Figure 12:
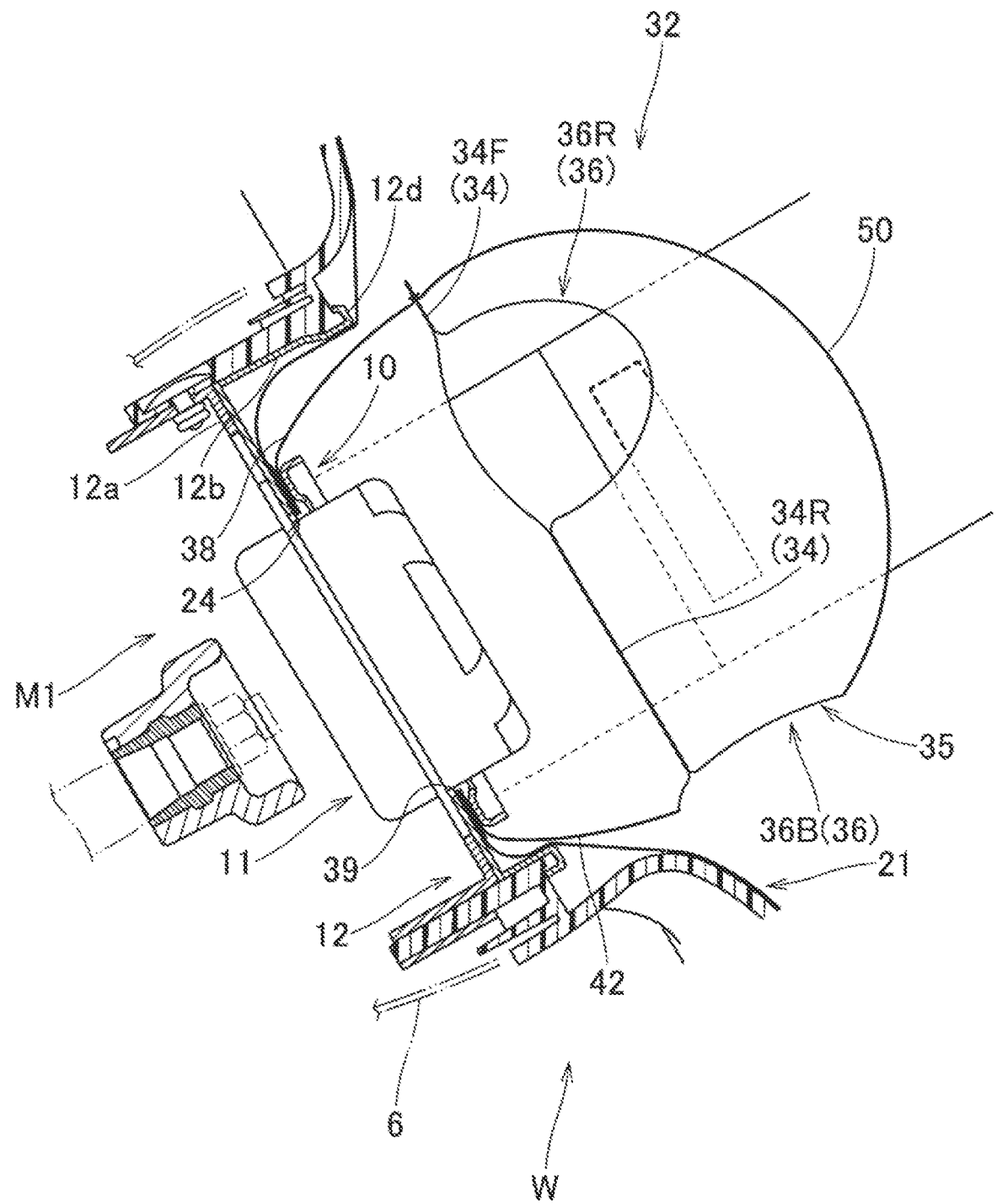
FIG. 12 is a partially enlarged view illustrating a vicinity of the rectifying member in a schematic vertical cross section when expansion of the airbag is completed.

Further, in the airbag device M1 of the first embodiment, the joining portion 34 of the rectifying member 32 is configured such that when the bag body 21 is unfolded and expanded, the joining portion is arranged in an area (specifically, the position above the upper end 12d of the peripheral wall portion 12b in the case 12) on the free space side protruding from the case 12 as the accommodation portion (see FIGS. 11 and 12). Therefore, when the bag body 21 is unfolded and expanded, the gas outlet port 36 will be arranged in the area (the area above case 12) on the free space side protruding from the case 12. Thus, the expansion gas G discharged from the gas outlet port 36 can be stably discharged so as to be further substantially along the ring surface RF without being affected by the peripheral wall portion 12b of the case 12. When those points are not considered, the joining portion of the rectifying member may be configured to be placed at a position substantially equal to the upper end of the peripheral wall portion in the case or below the upper end of the peripheral wall portion when the bag body is unfolded and expanded.

Further, in the airbag device M1 of the first embodiment, the driver side panel 50 is configured such that the distance D1 from the substantially center (center point C2) in the flatly unfolded state to the scheduled joining portion 53a which will form the joining portion 34 is larger than the distance D2 from the substantially center (center point C1) of the vehicle body side panel 38 in the flatly unfolded state to the scheduled joining portion 45a for forming the joining portion 34. Therefore, in the airbag device M1 of the embodiment, the driver MD side (upper side) of the inflow opening 24 (the opening portion 39 in the vehicle body side panel 38, and in the case of the embodiment, the body portion 11a of the inflator 11) can be widely covered by the driver side panel 50. Therefore, the expansion gas G flowing in from the inflow opening 24 (in the case of the embodiment, discharged from the gas discharge port 11b of the body portion 11a) can be accurately deflected by the driver side panel 50 which widely covers the driver MD side (it is possible to deflect the expansion gas G downward so that it approaches the ring surface RF). As a result, the expansion gas G can be more stably discharged via the gas outlet port 36 so as to substantially follow the ring surface RF. When those points are not considered, it may be configured such that the driver side panel has almost the same external dimensions as the vehicle body side panel, and the distance from the substantially center to the scheduled joining portion in the driver side panel in the flatly unfolded state is approximately the same as the distance from the substantially center to the scheduled joining portion in the vehicle body side panel in the flatly unfolded state.

Figure 8:
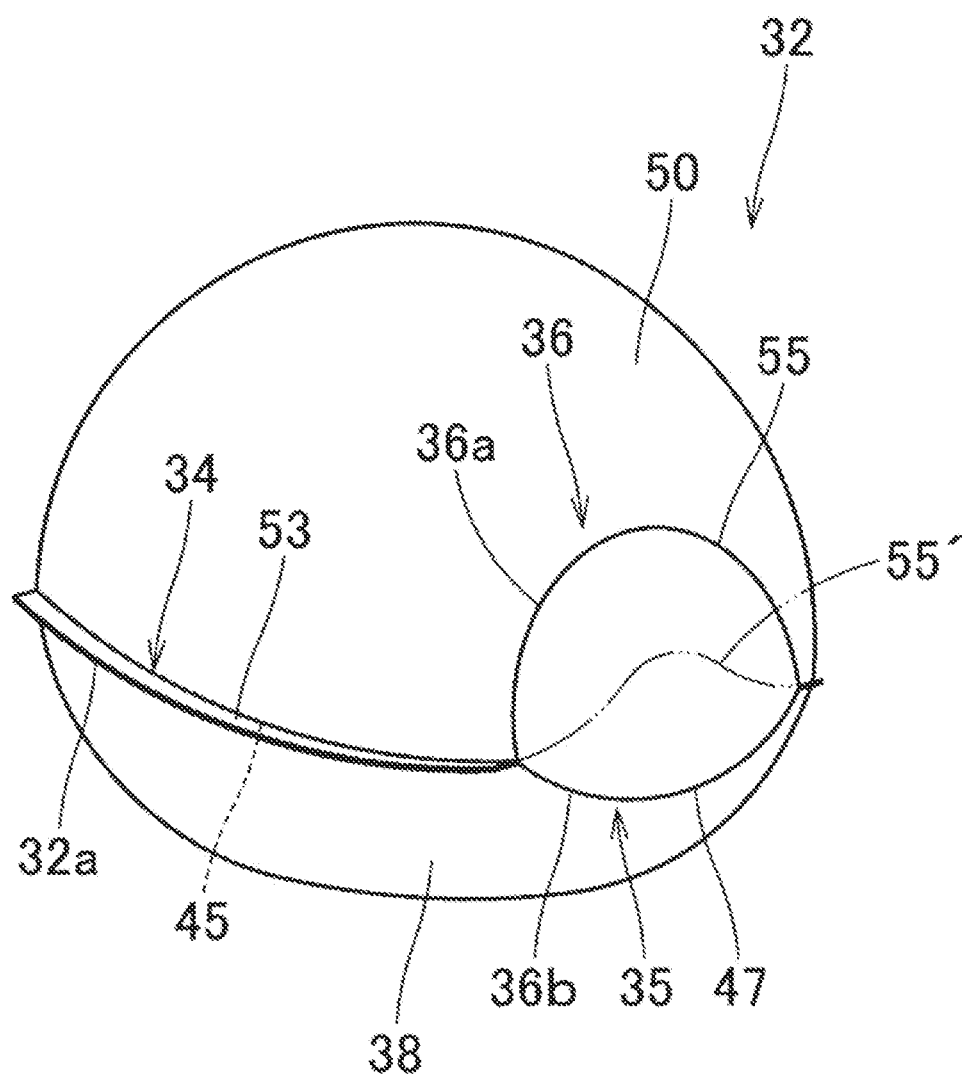
FIG. 8 is a schematic perspective view illustrating a state in which the rectifying member of FIG. 6 is expanded by itself.

Furthermore, in the airbag device M1 of the first embodiment, the non-joining region side edge portions 55 (55B, 55L, and 55R) in the driver side panel 50 are configured in a shape where, in a state where the driver side panel 50 is flatly unfolded, two arcs recessed inward from the straight line PL2 connecting the terminals 34a (the terminals 53b of the scheduled joining portions 53a) of the joining portions 34 on both sides are arranged side by side so as to lengthen the circumference. Specifically, in the embodiment, the non-joining region side edge portion 55 is configured to have the two arcuate curved portions 55a and 55b and the substantially linear connecting portion 55c connecting between the curved portions 55a and 55b, and is configured so that the connecting portion 55c is located further on the inner side than the straight line PL2. Therefore, in the rectifying member 32 in the expanded state by inflowing the expansion gas G flowing from the inflow opening 24 (opening portion 39) into the inside, it is possible to prevent the non-joining region side edge portion 55 forming the peripheral edge (upper edge 36a) of the gas outlet port 36 from hanging downward so as to narrow the opening of the gas outlet port 36 (like making the center of the upper edge 36a closer to the lower edge 36b side). As a result, the gas outlet port 36 can be wide open, and thus the expansion gas can be quickly discharged from the gas outlet port 36 into the bag body 21. In the airbag device M1 of the embodiment, as illustrated in FIG. 8, the non-joining region side edge portion 55 forming the upper edge 36a of each gas outlet port 36 is arranged in a substantially arcuate shape when the rectifying member 32 is expanded at the initial stage of the expansion of the bag body 21, and the gas outlet port 36 is stably and greatly opened. In particular, in the embodiment, since the non-joining region side edge portion 55 connects the arcuate curved portions 55a and 55b with the linear connecting portion 55c, the area of the driver side panel 50 can be secured widely by the amount that the connecting portion 55c is arranged, and thus the area receiving the expansion gas G can be increased. Of course, the non-joining region side edge portion may have a shape in which two arcs are directly connected without interposing the connecting portion, as in the case of joined region side edge portions 115L and 115R in a driver side panel 110 described below.

By the way, as illustrated by the two-dot chain line in FIG. 7B, when a non-joining region side edge portion 55' is simply curved into one arcuate shape which is recessed inward, a portion near this non-joining region side edge portion 55' hangs downward so that the central side approaches the lower edge side as illustrated by the two-dot chain line in FIG. 8 when the rectifying member 32 expands. As a result, the gas outlet port cannot be opened stably and greatly. Of course, when those points are not considered, the non-joining region side edge portion does not have to have the shape described above, and may be configured, for example, in a shape curved in a single arcuate shape which is recessed inward, or in a substantially straight-line shape.

Further, in the airbag device M1 of the first embodiment, the joining portion 34 is formed on the outer peripheral edge 43 side of the flatly unfolded vehicle body side panel 38 in a substantially straight-line shape instead of an arcuate shape. Therefore, it is possible to suppress the accumulation of the expansion gas in the vicinity of the joining portion 34 once, and thus it is possible to discharge the expansion gas from the gas outlet port 36 more quickly. When those points are not considered, in a state where the vehicle body side panel is unfolded flatly, the joining portion (scheduled joining portion) may be curved in an arcuate shape so as to protrude outward, or may be further curved in an arcuate shape so as to protrude inward.

Figure 13:
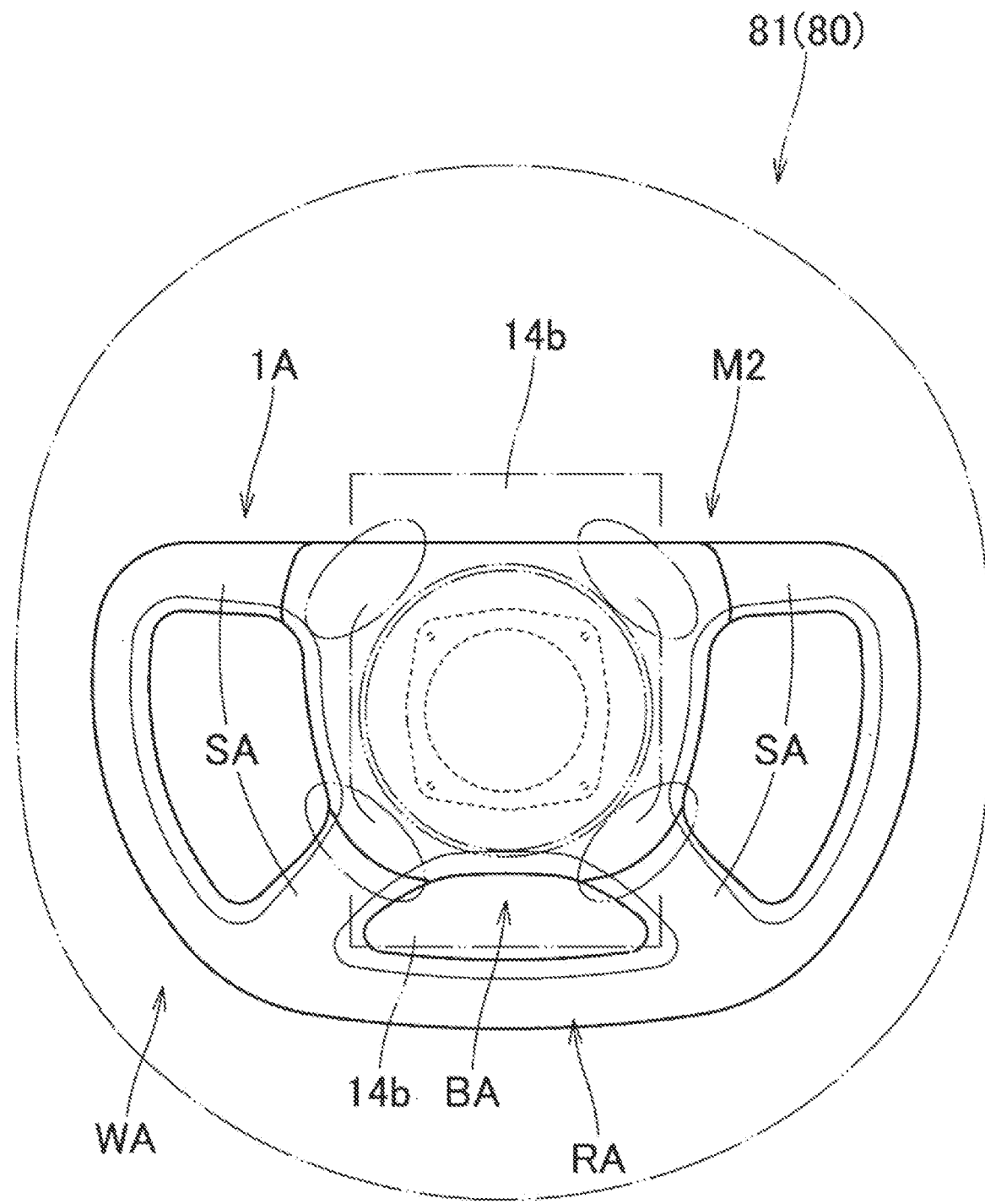
FIG. 13 is a schematic plan view illustrating a steering wheel airbag device according to a second embodiment of the present invention.
Figure 14:
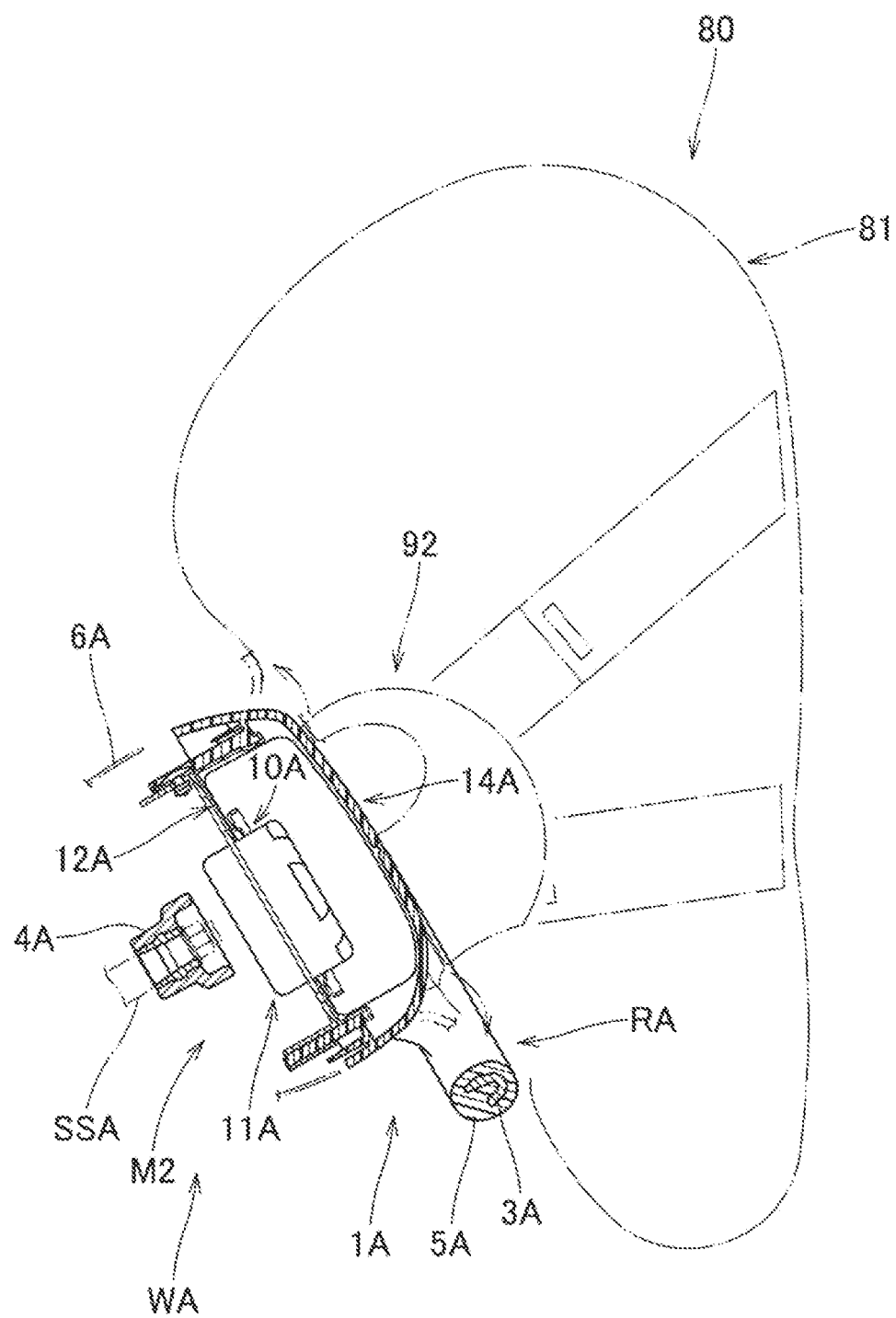
FIG. 14 is a schematic vertical cross-sectional view of the steering wheel airbag device according to the second embodiment when mounted on a vehicle.

Next, an airbag device M2 according to a second embodiment of the present invention will be described. The airbag device M2 of the second embodiment is mounted on a steering wheel WA having a ring portion RA having a substantially square annular shape as illustrated in FIG. 13. Specifically, the ring portion RA is set so that a width dimension on a front-rear direction side in the straight-ahead steering state is smaller than a width dimension on a left-right direction side, and is a horizontally long substantially square annular shape when viewed from the upper side. The steering wheel WA includes a steering wheel body 1A and the airbag device M2 located above a boss portion BA at a central portion of the steering wheel body 1A, as illustrated in FIGS. 13 and 14. Since the member other than the airbag device M2 in the steering wheel WA, that is, the steering wheel body 1A has substantially the same configuration as the steering wheel W described above except for the shape of the ring portion RA, "A" is added to the end of the figure reference numerals of the same member, and detailed description thereof will be omitted. In the steering wheel WA, left and right spoke portions SA on the front side also form an area on the front side of the ring portion RA.

As illustrated in FIG. 14, the airbag device M2 includes an airbag 80 which is folded and accommodated, an inflator 11A which supplies expansion gas to the airbag 80, a case 12A (bag holder) as a accommodation portion which accommodates and holds the airbag 80 and the inflator 11A, an airbag cover 14A which covers the folded airbag 80, and a retainer 10A which attaches the airbag 80 and the inflator 11A to the case 12A. In the airbag device M2, since the members other than the airbag 80 are the same members as the airbag device M1 described above, "A" is added to the end of the same figure reference numerals, and detailed description thereof will be omitted.

Figure 15:
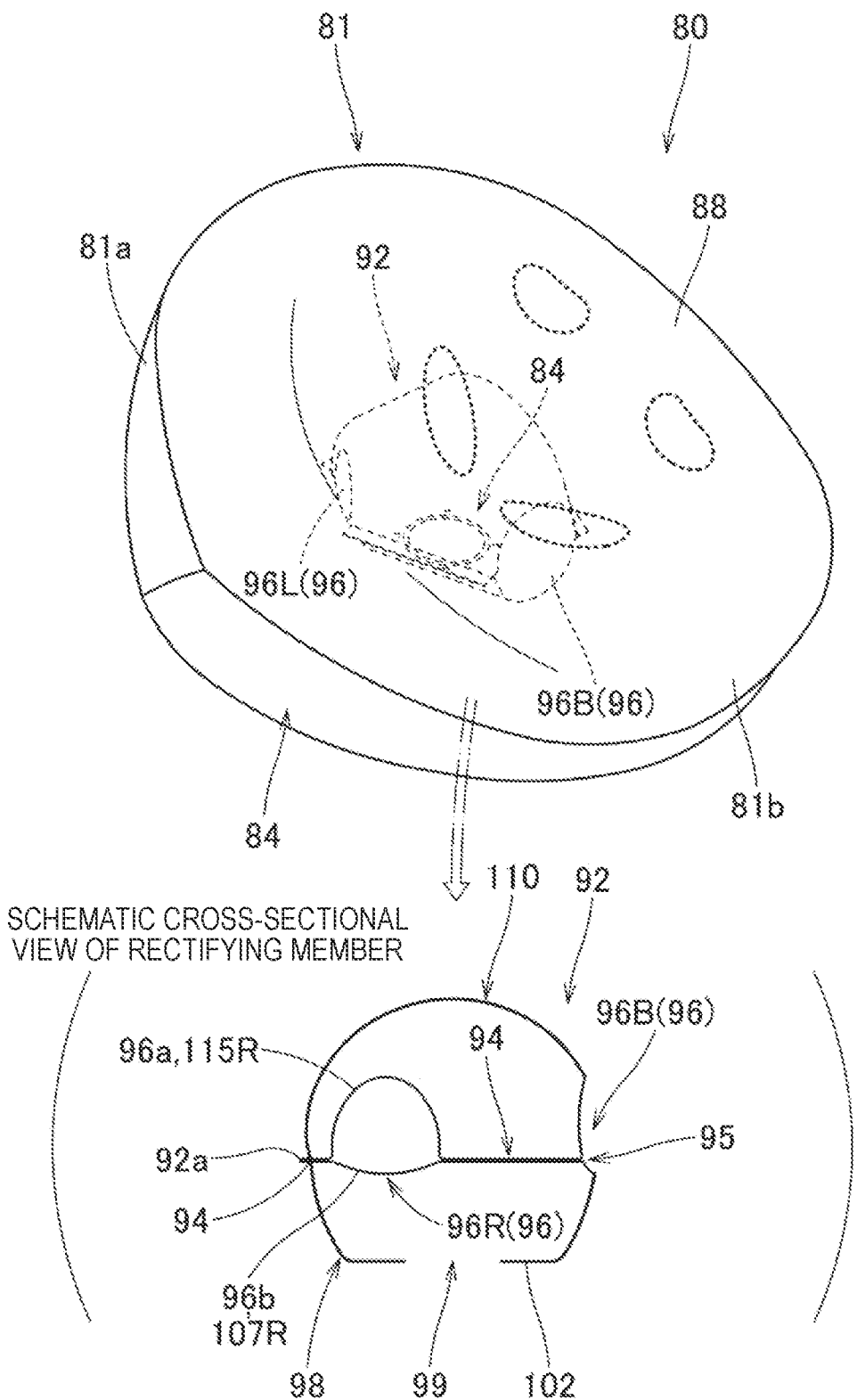
FIG. 15 is a schematic perspective view illustrating a state in which an airbag used in the steering wheel airbag device of the second embodiment is expanded by itself.
Figure 21:
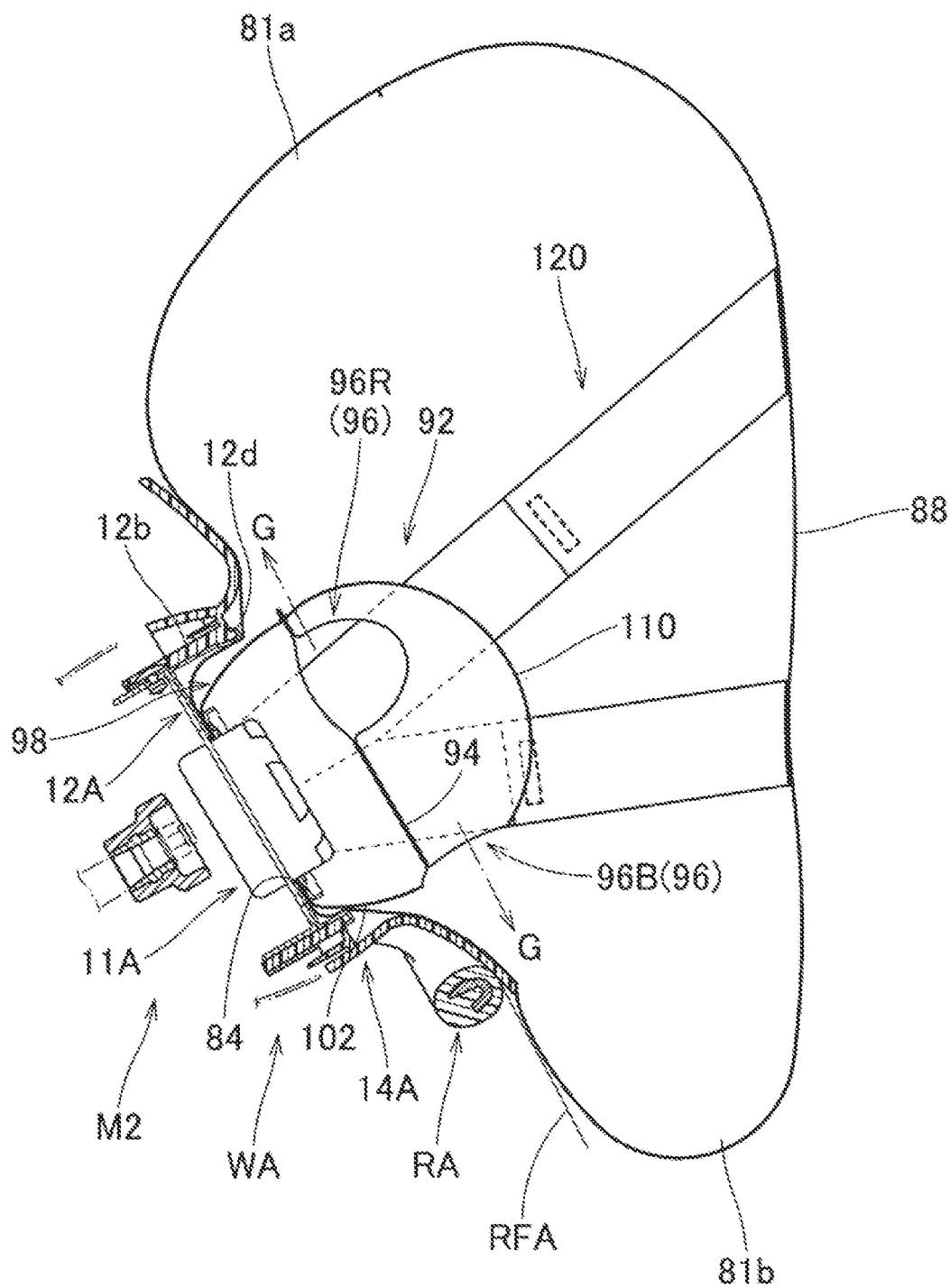
FIG. 21 is a schematic vertical cross-sectional view illustrating a state in which the airbag has completed expansion in the steering wheel airbag device according to the second embodiment.

As illustrated in FIGS. 15 and 21, the airbag 80 includes a bag body 81 having a bag shape, a rectifying member 92 arranged in the bag body 81, and a tether 120 which regulates a completed expansion shape of the bag body 81.

As illustrated in the two-dot chain line of FIGS. 13 and 14 and FIG. 21, the bag body 81 has a completed expansion shape which is substantially circular so that it can cover the entire ring portion RA when viewed from above. Also, the bag body 81 is configured to have a substantially drop shape in which a thickness dimension on the front side is larger than a thickness dimension on the rear side when viewed from the side. The bag body 81 includes a driver side wall portion 88 arranged on the driver MD side when expansion is completed, and a vehicle body side wall portion 83 arranged on the steering wheel WA side. When the expansion of the airbag 80 is completed, the driver side wall portion 88 is inclined with respect to a ring surface RFA and is arranged so as to be substantially along the up-down direction (see FIG. 21). Similar to the bag body 21 described above, the vehicle body side wall portion 83 is formed with an inflow opening 84 which opens in a substantially circular shape so that the expansion gas can flow into the inside, and four attachment holes 85 for inserting bolts (not illustrated) of the retainer 10A (see FIG. 16). Further, a vent hole 86 for exhausting excess expansion gas which has flowed into the bag body 81 is also formed in the vehicle body side wall portion 83.

Figure 16:
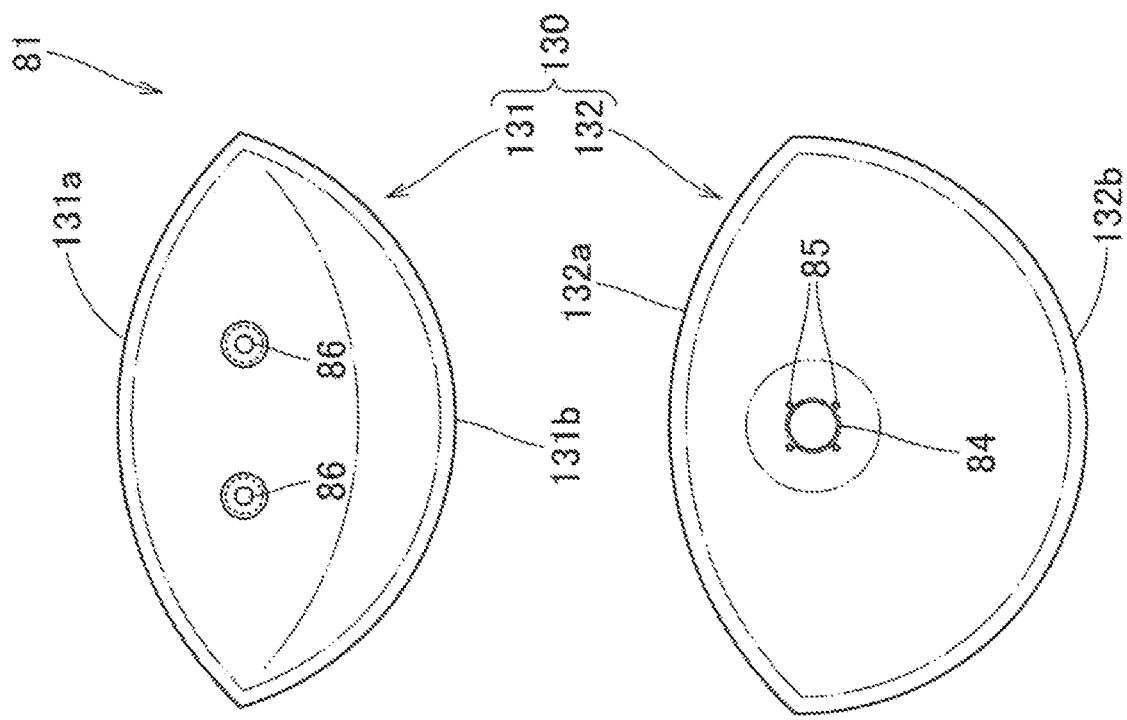
FIG. 16 is a plan view illustrating a state in which base materials forming the airbag of FIG. 15 are arranged side by side.
Figure 16:
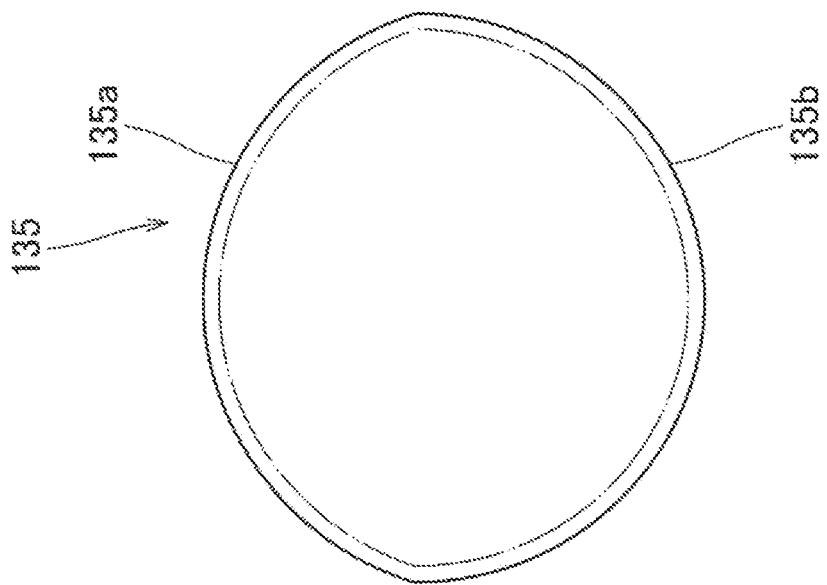

As illustrated in FIG. 16, the bag body 81 is formed of a driver side panel 135 for forming the driver side wall portion 88, and a vehicle body side panel 130 which will form the vehicle body side wall portion 83. The vehicle body side panel 130 is composed of two members, a rear member 132 having the inflow opening 84 and a front member 131 having the vent hole 86. The driver side panel 135 has a substantially elliptical external shape when it is flatly unfolded, and a front edge 135a and a rear edge 135b have a substantially arcuate shape with different curvatures. Specifically, the driver side panel 135 has the rear edge 135b set to have a larger curvature than the front edge 135a. Both the rear member 132 and the front member 131 forming the vehicle body side panel 130 are configured such that the external shape when it is flatly unfolded is a substantially elliptical shape, and each of the rear member 132 and the front member 131 is configured so that the width dimension on the left-right direction side matches the width dimension on the left-right direction side of the driver side panel 135. The front member 131 is configured such that a front edge 131a and a rear edge 131b have a substantially arcuate shape with different curvatures, and the rear edge 131b is set to have a larger curvature than the front edge 131a. The rear edge 131b of the front member 131 is configured to match the curved state with that of the front edge 135a of the driver side panel 135. In the rear member 132, in detail, the front edge 132a and the rear edge 132b are formed into a substantially arcuate shape having different curvatures so that the rear edge 132b is set to have a larger curvature than that of the front edge 132a, and the inflow opening 84 is arranged further on a front side than the front-rear center. In this rear member 132, the front edge 132a is configured to match the curved state with that of the front edge 131a of the front member 131, and the rear edge 132b is configured to match the curved state with that of the rear edge 135b of the driver side panel 135. Further, the bag body 81 has a bag shape by sewing the front edges 131a and 132a of the front member 131 and the rear member 132 to each other, sewing the front edge 135a of the driver side panel 135 with the rear edge 131b of the front member 131, and sewing the rear edge 135b to the rear edge 132b of the rear member 132. The driver side panel 135 and the vehicle body side panel 130 (a front member 131 and a rear member 132) forming the bag body 81 are formed of a flexible woven fabric made of polyamide yarn, polyester yarn, or the like.

The rectifying member 92 is arranged in the bag body 81 so as to cover the inflow opening 84, and rectifies the expansion gas G discharged from the inflator 11A and causes the rectified expansion gas to flow out into the bag body 81 (see FIG. 21). Similarly to the rectifying member 32 in the airbag 20 described above, the rectifying member 92 is configured to include three gas outlet ports (a left gas outlet port 96L, a right gas outlet port 96R, and a rear gas outlet port 96B) such that the expansion gas discharged from the inflator 11A can flow out substantially along the ring surface RFA of the ring portion RA and flow out to the left, right, and rear three sides in the straight-ahead steering state of the steering wheel WA. The rectifying member 92 is configured by partially joining (sewing) outer peripheral edges of a vehicle body side panel 98 arranged on the steering wheel WA side and a driver side panel 110 arranged on the driver MD side, both panels being formed from sheet bodies having flexibility. The rectifying member 92 is configured so as to arrange joining portions 94 (a front joining portion 94F, a rear left joining portion 94L, and a rear right joining portion 94R) for joining corresponding edges of the vehicle body side panel 98 and the driver side panel 110 to each other and gas outlet ports 96 (the left gas outlet port 96L, the right gas outlet port 96R, and the rear gas outlet port 96B) composed of non-joining regions 95 between the joining portions 94 on the outer peripheral edge 92a side (see FIG. 15). The driver side panel 110 and the vehicle body side panel 98 forming the rectifying member 92 are formed of a flexible woven fabric made of polyamide yarn, polyester yarn, or the like, similarly to the bag body 81.

Figure 17:
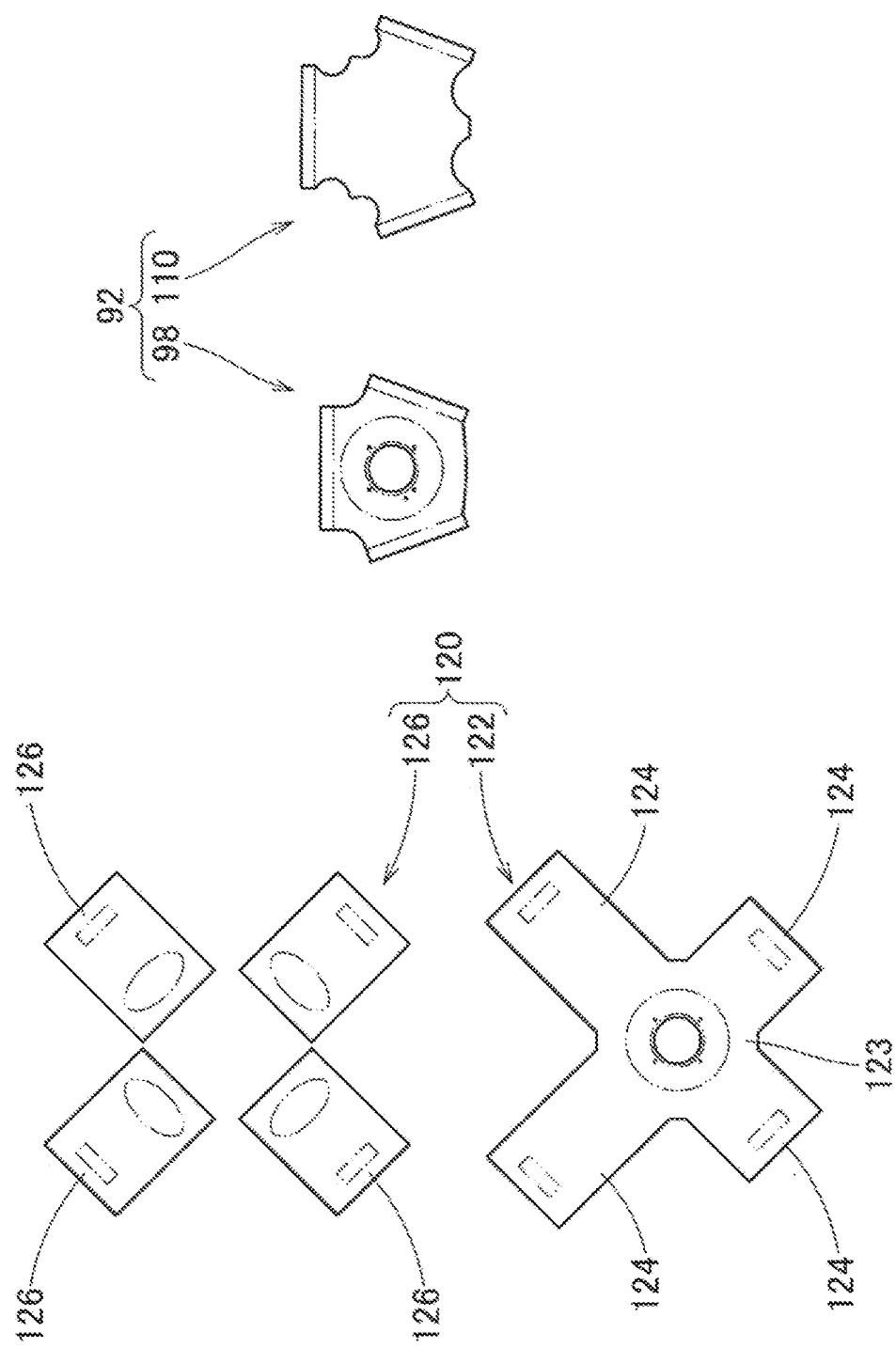
FIG. 17 is a plan view illustrating a state in which the remaining base materials are arranged side by side in the base material forming the airbag of FIG. 15.
Figure 18A:
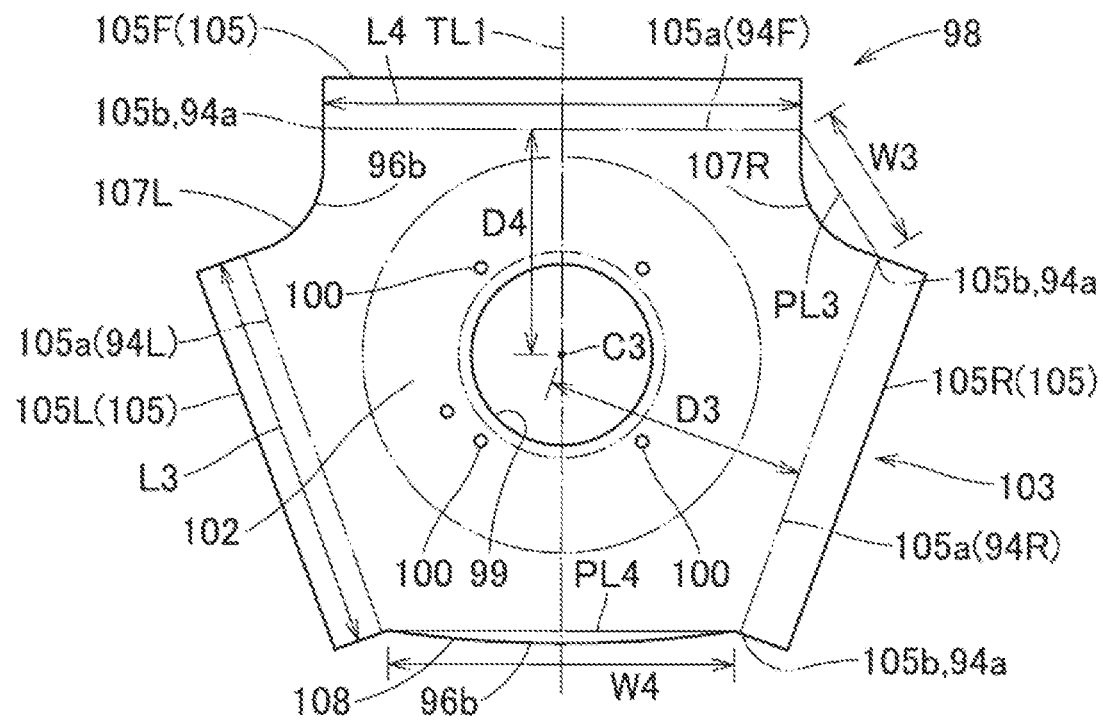
FIGS. 18A and 18B are plan views in which a vehicle body side panel and a driver side panel forming a rectifying member used for the airbag of FIG. 15 are arranged side by side.

In the case of the embodiment, as illustrated in FIGS. 17 and 18A, the vehicle body side panel 98 arranged on the steering wheel WA side has a substantially hexagonal external shape in which a front edge is substantially aligned in the left-right direction in the flatly unfolded state, and includes an opening portion 99 corresponding to the inflow opening 84 of the bag body 81 and a flat surface portion 102 connected to the opening portion 99. The opening portion 99 is arranged at a position approximately at a center of the vehicle body side panel 98 in the flatly unfolded state. The rectifying member 92 of the embodiment is configured to sew a peripheral edge of the opening portion 99 to a peripheral edge of the inflow opening 84 of the bag body 81 together with an attachment side portion 123 of a tether base material 122 forming the tether 120 described below, and then attach the peripheral edge of the opening portion 99 to the case 12A together with the peripheral edge of the inflow opening 84 by using the retainer 10A. On the peripheral edge of the opening portion 99, an attachment hole 100 through which the bolt (not illustrated) of the retainer 10A can be inserted is formed corresponding to the attachment hole 85 formed in the bag body 81. In addition, the vehicle body side panel 98 is configured such that three joining portions 94 joined to a corresponding outer peripheral edge 111 of the driver side panel 110 and three non-joining regions 95 between the joining portions 94 are arranged on an outer peripheral edge 103 side (an outer peripheral edge side of the vehicle body side panel 98 itself) of the flat surface portion 102. That is, in a state where the vehicle body side panel 98 is not connected with the driver side panel 110, the outer peripheral edge 103 of the vehicle body side panel 98 is configured to include three joining portion side edge portions 105 (105F, 105L, and 105R) from which the joining portions 94 will be formed, and three non-joining region side edge portions 107L, 107R, and 108 forming the non-joining regions 95 (that is, the edge portions of the gas outlet ports 96) (see FIG. 18A).

On the outer peripheral edge 103 of the vehicle body side panel 98, the joining portion side edge portions 105 (105F, 105L, and 105R) are composed of a front side where the front joining portion 94F will be formed, and a rear left side and a rear right side where the rear left joining portion 94L and the rear right joining portion 94R will be formed. Each of the joining portion side edge portions 105 is formed in a substantially straight-line shape. In a state where the vehicle body side panel 98 is unfolded flatly, the joining portion side edge portion 105F on the front side is formed as a substantially straight line shape substantially along the left-right direction, and the joining portion side edge portions 105L and 105R on the rear left side and the rear right side are respectively formed as substantially straight line shapes inclined with respect to the front-rear direction. In the embodiment, the joining portion side edge portions 105L and 105R on the rear left side and the rear right side are axisymmetric with respect to a straight line TL1 along the front-rear direction passing through a center point C3 which is the center (the center of the vehicle body side panel 98) of the opening portion 99. In the embodiment, the joining portion side edge portion 105F arranged on the front side has a width dimension (length dimension L4) set slightly larger than a width dimension (length dimension L3) of each of the joining portion side edge portions 105L and 105R arranged on the rear left side and the rear right side (see FIG. 18A). Also, in this vehicle body side panel 98, a distance D3 from a substantially center (center point C3) in the flatly unfolded state to a scheduled joining portion 105a in each of the joining portion side edge portions 105L and 105R on the rear left side and the rear right side and a distance D4 from the center point C3 to a scheduled joining portion 105a in the joining portion side edge portion 105F on the front side are configured to be different, and the distance D3 is set slightly larger than the distance D4 (see FIG. 18A).

The non-joining region side edge portions 107L, 107R, and 108 are composed of regions between the joining portion side edge portions 105. That is, specifically, the non-joining region side edge portions 107L, 107R, and 108 are composed of a rear region, a front left region, and a front right region, in the outer peripheral edge of the vehicle body side panel 98 in the flatly unfolded state. Each of the non-joining region side edge portion 107L, 107R, and 108 forms a lower edge 96b side at a peripheral edge of an opening of each of the gas outlet ports 96 (the left gas outlet port 96L, the right gas outlet port 96R, and the rear gas outlet port 96B) (see FIG. 15). In the embodiment, the non-joining region side edge portions 107L and 107R on the front left side and the front right side are axisymmetric with respect to the straight line TL1 along the front-rear direction passing through the center point C3. Also, in a state where the vehicle body side panel 98 is unfolded flatly, each of the non-joining region side edge portions 107L and 107R is curved in a substantially arcuate shape so as to be recessed inward from a straight line PL3 connecting terminals 94*a* (105*b*) of the joining portions 94 (scheduled joining portions 105*a*) on both sides (see FIG. 18A). In the case of the embodiment, in a state where the vehicle body side panel 98 is unfolded flatly, the non-joining region side edge portion 108 placed on the rear side is slightly curved in a substantially arcuate shape with a small curvature so as to protrude slightly outward from a straight line PL4 connecting terminals 94*a* (105*b*) of the joining portions 94 (scheduled joining portions 105*a*) on both sides (see FIG. 18A). In the case of the embodiment, in each of the non-joining region side edge portions 107L and 107R on the front left side and the front right side, a width dimension W3 (a length dimension of the straight line PL3) is set smaller than a width dimension W4 (a length dimension of the straight line PL3) of the non-joining region side edge portion 108 on the rear side. Specifically, the width dimension W3 is set to about ⅘ of the width dimension W4 of the non-joining region side edge portion 108. Further, in the case of the embodiment, the width dimensions W3 and W4 of the non-joining region side edge portions 107L, 107R, and 108 are set smaller than the length dimensions L3 and L4 of the joining portion side edge portions 105L, 105R, and 105B (see FIG. 18A).

Figure 18B:
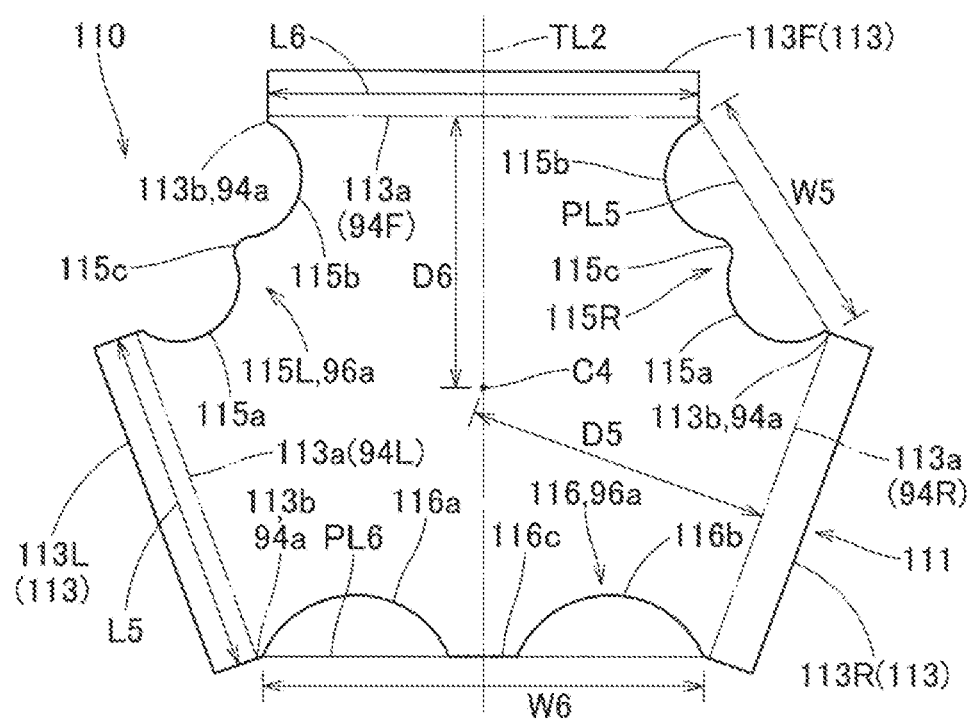

In the case of the embodiment, the driver side panel 110 arranged on the driver MD side is formed such that the external dimension of the driver side panel 110 is set larger than that of the vehicle body side panel 98, and the external shape of the driver side panel 110 in a flatly unfolded state is a substantially hexagonal shape with a front edge substantially along the left-right direction (See FIG. 17). As illustrated in FIG. 18B, the outer peripheral edge 111 of the driver side panel 110 is configured to include, corresponding to the joining portion side edge portions 105 (105F, 105L, and 105R) and non-joining region side edge portions 107L, 107R, and 108 formed on the outer peripheral edge 103 of the vehicle body side panel 98, three joining portion side edge portions 113 (113F, 113L, and 113R) for forming the joining portions 94, and three non-joining region side edge portions 115L, 115R, and 116 forming the non-joining regions 95 (that is, the edge portions of the gas outlet ports 96).

On the outer peripheral edge 111 of the driver side panel 110, the joining portion side edge portions 113 (113F, 113L, and 113R) are composed of a front side where the front joining portion 94F will be formed, and a rear left side and a rear right side where the rear left joining portion 94L and the rear right joining portion 94R will be formed. Each of the joining portion side edge portions 113 is formed in a substantially straight-line shape. Specifically, in a state where the driver side panel 110 is unfolded flatly, the joining portion side edge portion 113F on the front side is formed as a substantially straight line shape substantially along the left-right direction, and the joining portion side edge portions 113L and 113R on the rear left side and the rear right side are respectively formed as substantially straight line shapes inclined with respect to the front-rear direction. In the embodiment, the joining portion side edge portions 113L and 113R on the rear left side and the rear right side are axisymmetric with respect to a straight line TL2 along the front-rear direction passing through a center point C4, which is approximately a center of the front-rear and left-right in the vehicle body side panel 98 in a flatly unfolded state (see FIG. 18B). In the embodiment, as illustrated in FIG. 18B, the joining portion side edge portion 113F arranged on the front side has a width dimension (length dimension L6) set slightly larger than a width dimension (length dimension L5) of each of the joining portion side edge portions 113L and 113R arranged on the rear left side and the rear right side. The length dimensions L5 and L6 of these joining portion side edge portions 113F, 113L, and 113R are set to be substantially the same as the length dimensions L3 and L4 of the corresponding joining portion side edge portions 105F, 105L, and 105R of the vehicle body side panel 98, respectively. Also, in this driver side panel 110, a distance D5 from a substantially center (center point C4) in the flatly unfolded state to a scheduled joining portion 113*a* in each of the joining portion side edge portions 113L and 113R on the rear left side and the rear right side and a distance D6 from the center point C4 to a scheduled joining portion 113*a* in the joining portion side edge portion 113F on the front side are configured to be different, and the distance D5 is set slightly larger than the distance D6 (see FIG. 18B).

The non-joining region side edge portions 115L, 115R, and 116 are composed of regions between the joining portion side edge portions 113. The non-joining region side edge portions 115L, 115R, and 116 are composed of a rear region, a front left region, and a front right region, in the outer peripheral edge 111 of the driver side panel 110 in the flatly unfolded state. Each of the non-joining region side edge portion 115L, 115R, and 116 forms an upper edge 96*a* side at a peripheral edge of an opening of each of the gas outlet ports 96 (the left gas outlet port 96L, the right gas outlet port 96R, and the rear gas outlet port 96B). In the embodiment, as illustrated in FIG. 18B, the non-joining region side edge portions 115L and 115R on the front left side and the front right side are axisymmetric with respect to the straight line TL2 along the front-rear direction passing through the center point C4. In a state where the driver side panel 110 is flatly unfolded, each of the non-joining region side edge portions 115L and 115R is configured so that two arcs recessed inward from a straight line PL5 connecting terminals 94*a* (113*b*) of the joining portions 94 (scheduled joining portions 113*a*) on both sides are arranged side by side so as to have a long circumference. In detail, each of the non-joining region side edge portions 115L and 115R is configured to have two curved portions 115*a* and 115*b* with a substantially arcuate shape which are recessed inward, and is configured in a concave arcuate shapes which are loosely connected so that an intersection 115*c* between the curved portions 115*a* and 115*b* is located further on an inner side than the straight line PL5. In a state where the driver side panel 110 is flatly unfolded, the non-joining region side edge portion 116 formed on the rear side is configured so that two arcs recessed inward from a straight line PL6 connecting terminals 94*a* (113*b*) of the joining portions 94 (scheduled joining portions 113*a*) on both sides are arranged side by side so as to have a long circumference. In detail, the non-joining region side edge portions 116 is configured to have two curved portions 116*a* and 116*b* with a substantially arcuate shape which are recessed inward, and a connecting portion 116*c* with a substantially straight line shape which connects the curved portions 116*a* and 116*b*, and is configured to arrange the connecting portion 116*c* at a position substantially coincided with the straight line PL6. As illustrated in FIG. 18B, in the non-joining region side edge portions 115L and 115R arranged on the front left side and the front right side, a width dimension W5 (a length dimension of the straight line PL5 described above) is set larger than a width dimension W3 of each of the corresponding non-joining region side edge portions 107L and 107R in the vehicle body side panel 98. Specifically, in the non-joining region side edge portions 115L and 115R, the width dimension W5 is set about twice the width dimension W3 of each of the non-joining region side edge portions 107L and 107R. In the non-joining region side edge portion 116 arranged on the rear side, a width dimension W6 (a length dimension of the straight line PL6 described above) is set larger than a width dimension W4 of the corresponding non-joining region side edge portion 108 in the vehicle body side panel 98. Specifically, in the non-joining region side edge portion 116, the width dimension W6 is set to about ⅞ of the width dimension W4 of the non-joining region side edge portion 108. Further, the width dimension W5 of each of the non-joining region side edge portions 115L and 115R on the front left side and the front right side is set smaller than the width dimension W6 of the non-joining region side edge portion 116 on the rear side. Specifically, in the non-joining region side edge portions 115L and 115R, the width dimension W5 is set to about ⅗ of the width dimension W6 of the non-joining region side edge portion 116. Further, in the case of the embodiment, the width dimension W5 of each of the non-joining region side edge portions 115L and 115R on the front left side and the front right side is set smaller than the length dimensions L5 and L6 of the joining portion side edge portions 113F, 113L, and 113R, and the width dimension W6 of the non-joining region side edge portion 116 on the rear side is set to be larger than the length dimensions L5 and L6 of the joining portion side edge portions 113F, 113L, and 113R.

The external dimension of the driver side panel 110 is set to be larger than that of the vehicle body side panel 98. In detail, in the driver side panel 110, the distance D6 from the substantially center (center point C4) in the flatly unfolded state to the scheduled joining portion 113a for forming the front joining portion 94F is configured to be larger than the distance D5 from the center (center point C3) of the opening portion in the vehicle body side panel 98 in the flatly unfolded state to the corresponding scheduled joining portion 105a for forming the front joining portion 94F (see FIGS. 18A and 18B). Further, in the driver side panel 110, the distance D5 from the center point C4 in the flatly unfolded state to each of the scheduled joining portions 113a for forming the rear left joining portion 94L and the rear right joining portion 94R is also set to a dimension larger than the distance D3 from the center point C3 in the vehicle body side panel 98 in the flatly unfolded state to each of the scheduled joining portions 105a for forming the rear left joining portion 94L and the rear right joining portion 94R. Specifically, the distance D6 is set to about ⅗ of the distance D4, and the distance D5 is set to about 5/4 of the distance D3. Further, in the rectifying member 92 of the embodiment, the distances D3 and D4 from the center point C3 to the scheduled joining portions 45a (joining portions 94) in the vehicle body side panel 98 are set to dimensions in which the joining portion 94 is placed in an area (above the upper end 12d of the peripheral wall portion 12b in the case 12A) on a free space side protruding from the case 12A when the bag body 81 is unfolded and expanded (see FIG. 21).

By overlapping the joining portion side edge portions 105 (105F, 105L, and 105R) on the vehicle body side panel 98 and the corresponding joining portion side edge portions 113 (113F, 113L, and 113R) on the driver side panel 110, respectively, and sewing the portions of the scheduled joining portions 105a and 113a with sutures, the joining portions 94 (94F, 94L, and 94R) having a substantially straight line shape are formed, in such a manner that the rectifying member 92 can be manufactured. Also, in the rectifying member 92, three gas outlet ports 96 (the rear gas outlet port 96B, the left gas outlet port 96L, and the right gas outlet port 96R) are composed of portions of the non-joining regions 95 between the joining portions 94. In the rectifying member 92, the non-joining region side edge portions 107L, 107R, 115L, and 115R arranged on the front left side and the front right side is symmetrical in the left-right direction, and the left gas outlet port 96L and the right gas outlet port 96R are set to have substantially the same external shape and have substantially the same opening area. The non-joining region side edge portion 108 arranged on the rear side in the vehicle body side panel 98 has the width dimension W4 as large as about ¾ of the width dimension W3 of each of the non-joining region side edge portions 107L and 107R arranged on the front left side and the front right side, and the non-joining region side edge portion 116 arranged on the rear side in the driver side panel 110 has the width dimension W6 as large as about ⅔ of the width dimension W5 of each of the non-joining region side edge portions 115L and 115R arranged on the front left side and the front right side. That is, the rear gas outlet port 96B has a configuration in which the opening area is set larger than that of the left gas outlet port 96L and the right gas outlet port 96R. In the case of the embodiment, the rear gas outlet port 96B sets the opening area to about three times (that is, larger than the sum of the opening areas of the left gas outlet port 96L and the right gas outlet port 96R) the left gas outlet port 96L or the right gas outlet port 96R.

The tether 120, which regulates the completed expansion shape of the bag body 81, is arranged so as to connect the peripheral edge of the inflow opening 84 in the vehicle body side wall portion 83 and a vicinity of the center of the driver side wall portion 88, and regulates a separation distance between the vicinity of the center of the driver side wall portion 88 and the peripheral edge of the inflow opening 84 when the expansion is completed. In the case of the embodiment, the tether 120 is formed at four locations, that is, the front left side, the front right side, the rear left side, and the rear right side of the inflow opening 84. As illustrated in FIG. 17, the tether 120 is composed of the tether base material 122 arranged on the vehicle body side wall portion 83 side and four tether components 126 arranged on the driver side wall portion 88 side. The tether base material 122 is configured to include an attachment side portion 123 having a substantially circular shape, which is joined to the vehicle body side wall portion 83, and four tether components 124 extending from an outer peripheral edge of the attachment side portion 123 and connected to respective tether components 126. The tether base material 122 and the tether components 126 forming the tether 120 are formed of a flexible woven fabric made of a polyamide yarn, a polyester yarn, or the like, similarly to the bag body 81 and the rectifying member 92.

The airbag 80 of the second embodiment can be manufactured by the same procedure as the airbag 20 of the first embodiment, and can be mounted on the vehicle by the same procedure.

Also, in the airbag device M2 of the second embodiment, the rectifying member 92 arranged in the bag body 81 is configured by partially joining the outer peripheral edges 103 and 111 of the vehicle body side panel 98 and the driver side panel 110, which are made of a flexible sheet body, to each other. Specifically, the vehicle body side panel 98 forming the rectifying member 92 has a configuration in which three joining portions 94 joined to the corresponding outer peripheral edges 111 of the driver side panel 110 and three non-joining regions 95 between the joining portions 94 are arranged on the outer peripheral edge 103 side of the flat surface portion 102 formed so as to be continuous from the opening portion 99 corresponding to the inflow opening 84 of the bag body 81. That is, also in the airbag device M2 of the second embodiment, the rectifying member 92 is formed by partially joining only the outer peripheral edges 103 and 111 of the sheet-shaped vehicle body side panel 98 and driver side panel 110, and gaps (non-joining regions 95) between the joining portions 94, which are configured by joining the outer peripheral edges 103 and 111 to each other, are configured as the gas outlet ports 96 for letting out the expansion gas. Therefore, compared to the rectifying member of the related art, which has a three-dimensional shape on a vehicle body side member, the configuration can be simplified, and it is also possible to suppress the bulkiness of the rectifying member when it is folded and accommodated together with the bag body 81. Therefore, the airbag 80 can be folded compactly.

Therefore, in the airbag device M2 of the second embodiment, the rectifying member 92 arranged inside can be simply configured, and thus the airbag 80 can be compactly accommodated in the case 12A as an accommodation portion.

Further, in the airbag device M2 of the second embodiment, the joining portion 94 of the rectifying member 92 is configured such that when the bag body 81 is unfolded and expanded, as illustrated in FIG. 21, it is arranged in an area (the position above the upper end 12d of the peripheral wall portion 12b in the case 12A) on the free space side protruding from the case 12A. Therefore, when the bag body 81 is unfolded and expanded, the gas outlet port 96 will be arranged in the area (the area above case 12A) on the free space side protruding from the case 12A. Thus, the expansion gas G discharged from the gas outlet port 96 can be stably discharged so as to be substantially along the ring surface RFA without being affected by the peripheral wall portion 12b of the case 12A.

Further, also in the airbag device M2 of the second embodiment, the driver side panel 110 is configured such that the distances D5 and D6 from the substantially center (center point C4) in the flatly unfolded state to the scheduled joining portions 113a for forming the joining portions 94 are larger than the distances D3 and D4 from the substantially center (center point C3) of the vehicle body side panel 98 in the flatly unfolded state to the scheduled joining portions 105a for forming the joining portions 94. Therefore, also in the airbag device M2 of the second embodiment, the driver MD side (upper side) of the inflow opening 84 (the opening portion 99 in the vehicle body side panel 98, and in the case of the embodiment, the body portion 11a of the inflator 11) can be widely covered by the driver side panel 110. Therefore, the expansion gas G flowing in from the inflow opening 84 can be accurately deflected by the driver side panel 110 which widely covers the driver MD side (it is possible to deflect the expansion gas G downward so that it approaches the ring surface RFA). As a result, the expansion gas G can be more stably discharged via the gas outlet port 96 so as to substantially follow the ring surface RFA.

Furthermore, also in the airbag device M2 of the second embodiment, the non-joining region side edge portions 115L, 115R, and 116 in the driver side panel 110 are configured in a shape where, in a state where the driver side panel 110 is flatly unfolded, two arcs recessed inward from each of the straight lines PL5 and PL6 connecting the terminals 94a (the terminals 113b of the scheduled joining portions 113a) of the joining portions 94 on both sides are arranged side by side so as to lengthen the circumference.

Therefore, in the rectifying member 92 in the expanded state by inflowing the expansion gas G flowing from the inflow opening 84 (opening portion 99) into the inside, it is possible to prevent the non-joining region side edge portions 115L, 115R, and 116 forming the peripheral edges (upper edges 96a) of the gas outlet ports 96 from hanging downward so as to narrow the openings of the gas outlet ports 96. As a result, the gas outlet port 96 can be wide open, and thus the expansion gas can be quickly discharged from the gas outlet port 96 into the bag body 81.

Further, also in the airbag device M2 of the second embodiment, the joining portion 94 is formed on the outer peripheral edge 103 side of the flatly unfolded vehicle body side panel 98 in a substantially straight-line shape instead of an arcuate shape. Therefore, it is possible to suppress the accumulation of the expansion gas in the vicinity of the joining portion 94 once, and thus it is possible to discharge the expansion gas from the gas outlet port 96 more quickly.

Furthermore, in the airbag device M2 of the second embodiment, the rectifying member 92 is configured such that the opening area of the rear gas outlet port 96B through which the expansion gas can flow out to the rear is set to be larger than the sum of the opening areas of the left gas outlet port 96L through which the expansion gas can flow out to the left and the right gas outlet port 96R through which the expansion gas can flow out to the right. In the case of the embodiment, the opening area of the rear gas outlet port 96B is set to about three times the opening area of each of the left gas outlet port 96L and the right gas outlet port 96R. Therefore, in the initial stage of expansion of the airbag 80, the expansion gas can flow into the region on the rear end side of the bag body 81 more quickly, and thus the bag body 81 can be made to enter between the abdominal portion MA of the driver MD and the ring portion RA more quickly.

Specifically, the airbag device M2 of the second embodiment is configured to be mounted on the steering wheel WA which has a horizontally long substantially square ring portion RA in which, compared to the ring portion R of the steering wheel W on which the above-described airbag device M1 is mounted, a front region and a rear region are removed in a straight-ahead steering state. In the airbag device M2 of the second embodiment, three gas outlet ports 96 of the rectifying member 92 are arranged so that the expansion gas G can flow out substantially along the ring surface RFA of the ring portion RA on the left, right, and rear three sides of the steering wheel WA in the straight-ahead steering state. Further, in the airbag device M2 of the second embodiment, as described above, the rectifying member 92 is configured such that the opening area of the rear gas outlet port 96B is set to be larger than the sum of the opening areas of the left gas outlet port 96L and the right gas outlet port 96R. In the initial stage of the expansion of the airbag 80, the expansion gas can be quickly flowed into the rear side of the bag body 81, and the expansion gas G flowing backward from the rear gas outlet port 96B so as to substantially follow the ring surface RFA of the ring portion RA makes a rear end side portion 81b of the bag body 81 quickly enter between the abdominal portion MA of the driver MD and a rear end region of the ring portion RA. Therefore, although the steering wheel WA on which the airbag device M2 of the second embodiment is mounted has a configuration in which it is difficult to support the rear end side portion 81b of the expanded airbag 80 (bag body 81) by the ring portion RA, even without the support of the ring portion RA, the quickly expanded rear end side portion 81b of the bag body 81 can smoothly protect the abdominal portion MA of the driver MD.

Figure 19A:
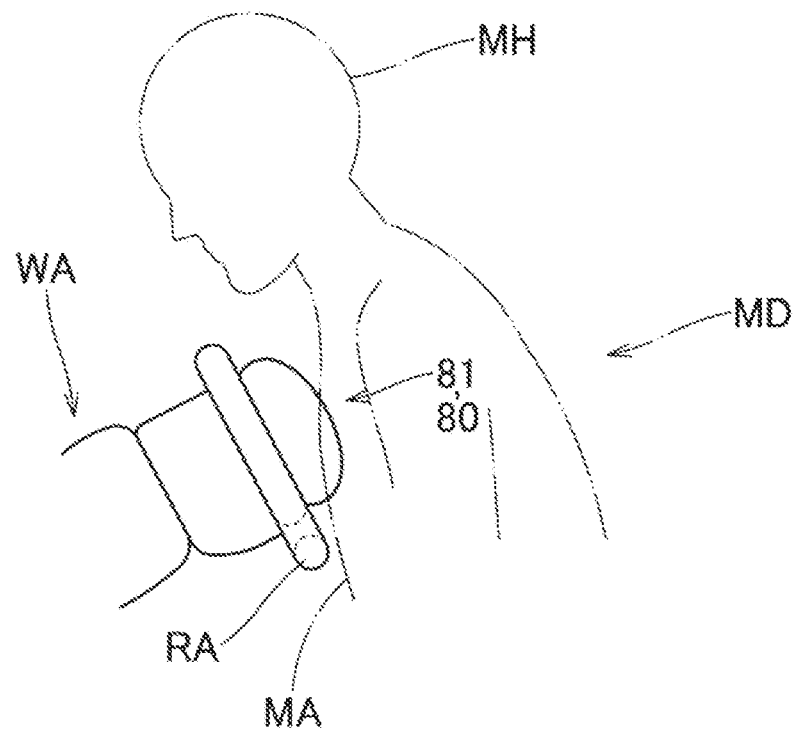
FIGS. 19A and 19B are schematic side views illustrating an airbag expansion process in the steering wheel airbag device according to the second embodiment.
Figure 19B:
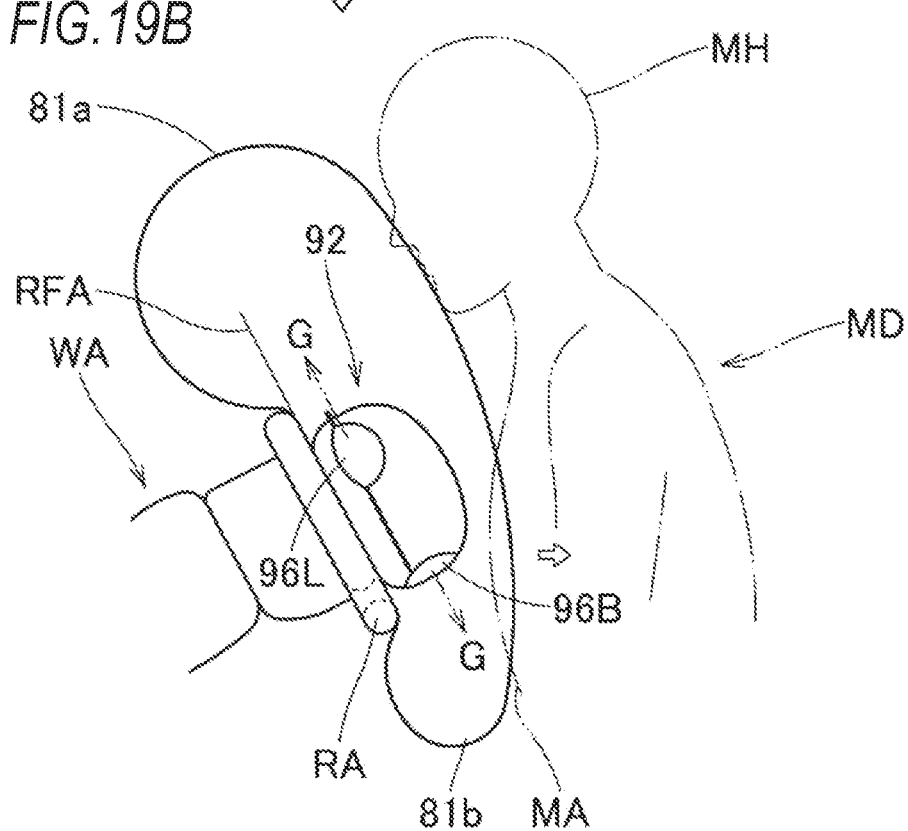
Figure 20:
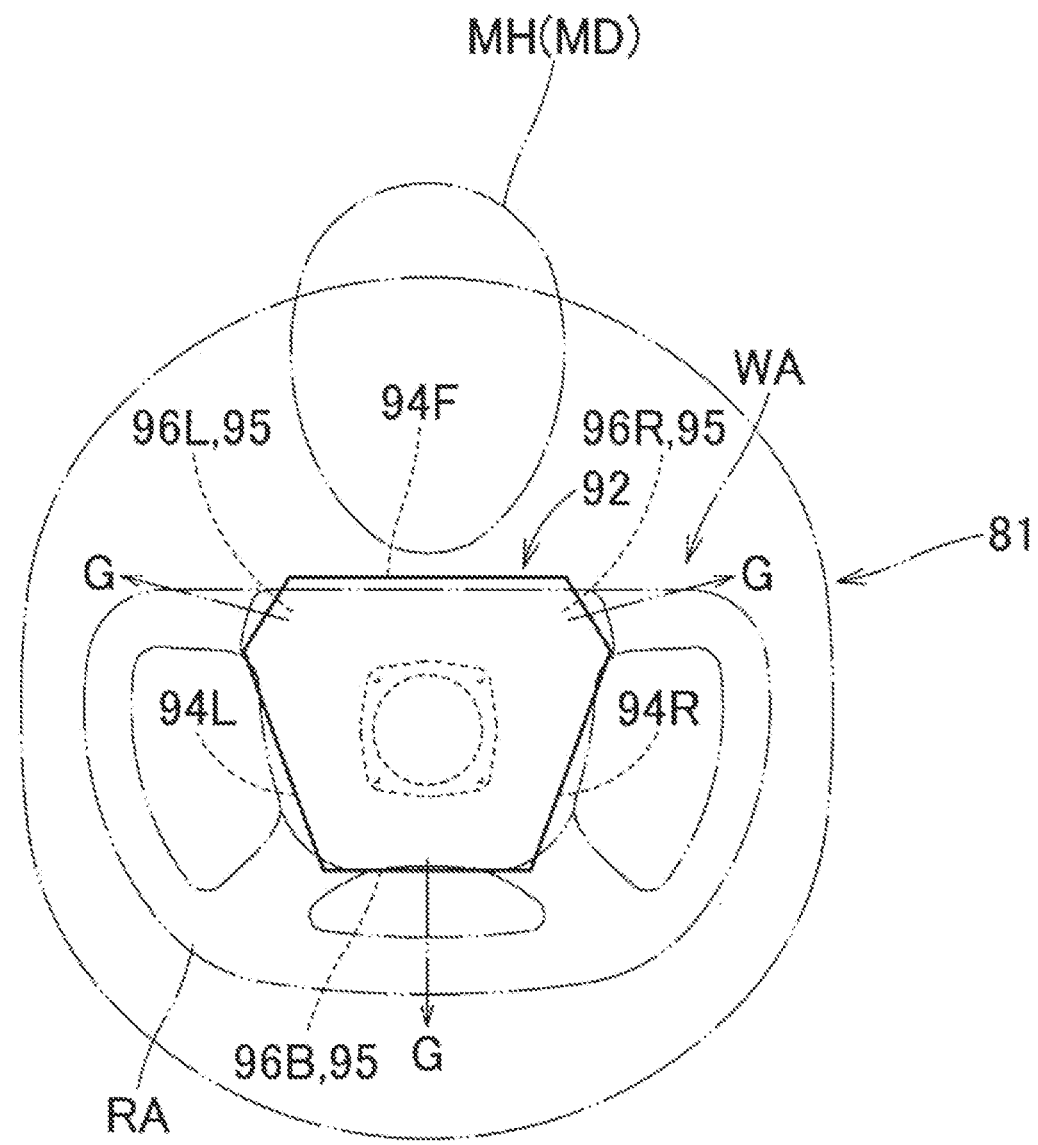
FIG. 20 is a schematic plan view illustrating an outflow of expansion gas from the rectifying member into a bag body in the steering wheel airbag device according to the second embodiment.

Further, in the airbag device M2 of the second embodiment, in the initial stage of expansion of the airbag 80, the expansion gas discharged from the inflator 11A does not flow to the driver MD side in the bag body 81, and flows out substantially along the ring surface RFA. When, as illustrated in FIG. 19A, the airbag device M2 is operated in a state where the driver MD sits close to the steering wheel WA, the bag body 81 does not directly press the driver MD upward at the initial stage of expansion, and the bag body 81 is to be widely unfolded along the ring surface RFA of the steering wheel WA so as to allow expansion gas to flow into the inside and first enter between the driver MD and the steering wheel WA, as illustrated in FIG. 19B. At the initial stage of the expansion of the bag body 81, in the area on the front side of the bag body 81, as illustrated in FIG. 20, the expansion gas G discharged from the inflator 11A flows in from the left gas outlet port 96L and the right gas outlet port 96R in the rectifying member 92 toward the left and the right. That is, it is possible to suppress the expansion gas discharged from the inflator 11A from flowing forward from the rectifying member 92 into the bag body 81. Therefore, even when the driver MD is sitting with ahead portion MH close to the steering wheel WA, the bag body 81 protrudes so as to shift to the left and right sides of the head portion MH of the driver MD, and thus it is possible to suppress the expansion of the bag body 81 so as to protrude in a straight line toward the head portion MH of the driver MD, and to suppress the pressing of the head portion MH so as to bend backward. In the airbag device M2 of the second embodiment, on both the left and right sides of the head portion MH, a front end side portion 81a of the bag body 81 expands so as to allow expansion gas to flow into the inside from the left-right direction side and to enter below the ring portion RA in the steering wheel WA (see FIG. 19B), and thus even when it is configured such that the front end side portion 81a expands thicker than the rear end side portion 81b, it is possible to suppress pressing the head portion MH as much as possible. Therefore, in the airbag device M2 of the second embodiment, even when the driver MD is sitting close to the steering wheel WA, the rectifying member 92 can accurately control the inflow of the expansion gas into the bag body 81, and the expanding airbag 80 can smoothly protect the driver MD.

What is claimed is:

1. A steering wheel airbag device comprising:
    an airbag which allows expansion gas to flow in and expands to cover a steering wheel; and
    an inflator which supplies expansion gas to the airbag, wherein:
    the airbag which is folded and the inflator are accommodated in an accommodation portion formed in a boss portion located in a vicinity of a center of a ring portion to be gripped during steering in the steering wheel;
    the airbag includes:
        a bag body which has an inflow opening through which the expansion gas discharged from the inflator can flow into the inside and which can be expanded so as to cover an upper surface side of the steering wheel; and
        a rectifying member, which is arranged in the bag body so as to cover the inflow opening, rectifies the expansion gas discharged from the inflator, and causes the rectified expansion gas to flow out into the bag body;
    the rectifying member is provided with three gas outlet ports so that the expansion gas can flow out substantially along a ring surface of the ring portion and to left, right, and rear three sides in a straight-ahead steering state of the steering wheel;
    the rectifying member is configured by partially joining outer peripheral edges of a vehicle body side panel arranged on the steering wheel side and a driver side panel arranged on a driver side, both panels being formed from sheet bodies having flexibility;
    the vehicle body side panel is configured to have an opening portion corresponding to the inflow opening formed on the bag body and a flat surface portion connected to the opening portion and to have three joining portions which are joined to corresponding outer peripheral edges of the driver side panel and three non-joining regions between the joining portions arranged on an outer peripheral edge side of the flat surface portion; and
    the gas outlet port is configured by a portion of the non-joining region between the joining portions which join the outer peripheral edges of the vehicle body side panel and the driver side panel,
    wherein
    the driver side panel is configured such that a distance from a substantially center in a flatly unfolded state to a scheduled joining portion for forming the joining portion is set to be larger than a distance from a substantially center of the vehicle body side panel in a flatly unfolded state to a scheduled joining portion for forming the joining portion, and
    the non-joining region side edge portion in the driver side panel is configured in a shape where, in a state where the driver side panel is flatly unfolded, two arcs recessed inward from a straight line connecting terminals of the joining portions on both sides are arranged side by side so as to lengthen a circumference.

2. The steering wheel airbag device according to claim 1, wherein
    the rectifying member is configured to arrange the joining portion in an area on a free space side protruding from the accommodation portion when the bag body is unfolded and expanded.

3. The steering wheel airbag device according to claim 1, wherein
    the joining portion is formed in a substantially straight-line shape on the outer peripheral edge side of the vehicle body side panel which is flatly unfolded.

4. The steering wheel airbag device according to claim 1, wherein
    the rectifying member is configured such that an opening area of a rear gas outlet port through which the expansion gas can flow out to the rear is set to be larger than a sum of opening areas of a left gas outlet port through which the expansion gas can flow out to the left and a right gas outlet port through which the expansion gas can flow out to the right.

* * * * *